US012290951B2

(12) United States Patent
Mayer

(10) Patent No.: US 12,290,951 B2
(45) Date of Patent: May 6, 2025

(54) PRECISION SKIVER

(71) Applicant: Mayer Engineering, LLC, Dayton, MN (US)

(72) Inventor: Todd M. Mayer, Dayton, MN (US)

(73) Assignee: Mayer Engineering, LLC, Dayton, MN (US)

( * ) Notice: Subject to any disclaimer, the term of this patent is extended or adjusted under 35 U.S.C. 154(b) by 0 days.

(21) Appl. No.: 17/206,060

(22) Filed: Mar. 18, 2021

(65) Prior Publication Data

US 2021/0291395 A1 Sep. 23, 2021

Related U.S. Application Data

(63) Continuation-in-part of application No. 16/873,334, filed on Mar. 20, 2020, now Pat. No. 11,167,439.

(51) Int. Cl.
*B26D 3/00* (2006.01)
*B26D 1/58* (2006.01)
*B26D 1/00* (2006.01)

(52) U.S. Cl.
CPC ............. *B26D 3/001* (2013.01); *B26D 1/585* (2013.01); *B26D 2001/004* (2013.01)

(58) Field of Classification Search
CPC ... B26D 3/001; B26D 1/585; B26D 2001/004
See application file for complete search history.

(56) References Cited

U.S. PATENT DOCUMENTS

| | | | | | |
|---|---|---|---|---|---|
| 322,304 | A * | 7/1885 | Mander | B27G 17/04 30/484 |
| 1,052,881 | A * | 2/1913 | Best | B27G 17/02 30/484 |
| 1,440,649 | A | 1/1923 | Tvedt | |
| 2,199,380 | A | 5/1940 | Walraven | |
| 2,472,528 | A * | 6/1949 | Grimes | C14B 1/14 69/20 |
| 2,779,367 | A | 1/1957 | Forbes | |
| 3,329,046 | A * | 7/1967 | Hilton | H01B 15/006 83/924 |
| 4,001,934 | A | 1/1977 | Bell | |
| 4,124,015 | A | 11/1978 | Isaksson | |
| 4,300,287 | A | 11/1981 | Tibbs | |
| 4,524,657 | A * | 6/1985 | Griffith | B26D 7/28 83/575 |
| 4,592,253 | A | 6/1986 | Hatfield | |
| 4,628,783 | A | 12/1986 | Brownell et al. | |

(Continued)

FOREIGN PATENT DOCUMENTS

| | | | | |
|---|---|---|---|---|
| FR | 1196492 A | 11/1959 | | |
| FR | 2743520 A1 * | 7/1997 | G02B 6/245 |
| FR | 2844110 A1 * | 3/2004 | G02B 6/4497 |

*Primary Examiner* — Liang Dong
(74) *Attorney, Agent, or Firm* — Laabs Intellectual Property

(57) ABSTRACT

A skiver for precise removal of outside material from an elongated device, such as a medical catheter or the like, includes a longitudinal recess in a surface and a transverse replaceable blade therein. A removable cover holds the blade in place. In some embodiments, the skiver has a handle extending from the skiver. In other embodiments, an automated mechanism is used to move the elongated device through the skiver.

20 Claims, 19 Drawing Sheets

(56) References Cited

U.S. PATENT DOCUMENTS

| | | | | | |
|---|---|---|---|---|---|
| 4,892,295 | A * | 1/1990 | Keller | B25B 5/163 | 269/87.1 |
| 4,972,581 | A * | 11/1990 | McCollum | G02B 6/245 | 30/90.1 |
| 5,140,751 | A * | 8/1992 | Faust | G02B 6/4497 | 81/9.4 |
| 5,150,522 | A * | 9/1992 | Gwo-Jiang | H02G 1/1224 | 30/91.2 |
| 5,226,224 | A * | 7/1993 | Ishizuka | H02G 1/1268 | 83/947 |
| 5,306,378 | A * | 4/1994 | Takimoto | H02G 1/1256 | 30/90.1 |
| 5,311,663 | A | 5/1994 | Garze et al. | | |
| 5,419,044 | A | 5/1995 | Valliere | | |
| 5,577,150 | A * | 11/1996 | Holder | G02B 6/4475 | 81/9.51 |
| 5,771,586 | A | 6/1998 | Lotarski et al. | | |
| 5,771,587 | A | 6/1998 | Herold | | |
| 5,822,863 | A * | 10/1998 | Ott | G02B 6/566 | 30/90.9 |
| 5,865,085 | A | 2/1999 | Vollenweider | | |
| 6,751,876 | B2 | 6/2004 | Harold | | |
| 6,807,737 | B1 | 10/2004 | Davia | | |
| 7,533,595 | B2 | 5/2009 | Domenico | | |
| 7,735,404 | B2 | 6/2010 | Wilk | | |
| 8,250,960 | B2 | 8/2012 | Hayner et al. | | |
| 2004/0040163 | A1 | 3/2004 | Lin | | |
| 2004/0068878 | A1 * | 4/2004 | Lin | B27G 17/02 | 30/481 |
| 2005/0008823 | A1 * | 1/2005 | Schwar | B29C 65/18 | 428/156 |
| 2005/0229403 | A1 | 10/2005 | Diaz | | |
| 2006/0027063 | A1 | 2/2006 | Currier et al. | | |
| 2009/0094842 | A1 * | 4/2009 | Yoo | B26D 1/245 | 30/294 |
| 2012/0311866 | A1 | 12/2012 | Jones et al. | | |
| 2015/0047207 | A1 * | 2/2015 | Chernyshou | B26B 29/06 | 30/169 |
| 2016/0097911 | A1 | 4/2016 | George | | |
| 2017/0057115 | A1 | 3/2017 | Keeling | | |
| 2018/0105383 | A1 * | 4/2018 | Allen, Jr. | B65H 29/18 | |

* cited by examiner

PRECISION SKIVER

CROSS-REFERENCE TO RELATED APPLICATIONS

This application claims the benefit of U.S. patent application Ser. No. 16/873,334, filed Mar. 20, 2020, the entire content of which is hereby incorporated herein by reference.

TECHNICAL FIELD

The present invention relates generally to cutting tools, and more particularly to a new and unique skiver for precisely removing a thin layer of material from the outside of an elongated, tubular object such as a medical catheter.

BACKGROUND

In the manufacture of some products, such as medical catheters, for example, manufacturers may use a thin outer layer of thermoplastic heat shrink during construction of the products. In some circumstances, some catheters are formed using layers different materials, or have material changes along the length. The thin layer of thermoplastic is put on the product and heated to combine the multiple layers into one. This is called reflowing. The heat shrink pulls the product tight on a mandrel (metal or plastic rod in the center of the catheter) keeping it round. Similarly, some batteries are manufactured with such an outside layer to prevent electrical shorting before packaging. Such heat shrink is quite thin and tight on the product.

Some standard heat shrink can be removed by holding the product, making a small cut in the end of the layer to facilitate grasping the layer, then tearing the heat shrink in a spiral motion. This is nearly impossible on smaller devices, is time consuming and requires the use of an open blade. A peelable version of heat shrink has been invented to fix this problem. Peelable heat shrink requires a slit in the end of the heat shrink to create two tabs to grab on to. The tabs are then pulled perpendicular to the device to remove the heat shrink. This requires no open blades, but the peeled heat shrink can stretch up to three times longer in the perpendicular direction when compared to the starting length of the material. Removal with this method can be ergonomically undesirable as well as much more expensive than standard heat shrink.

Tools used for removing heat shrink have a sharp "tooth" or "shoe" that goes under the heat shrink. A vertical surgical blade is aligned with the sharp end pointing down the length of the catheter. The shoe or tooth is shoved between the heat shrink and the catheter dragging down the length. The shoe or tooth lifts the heat shrink and is slit by the blade. This type of skiving may leave drag marks along the length of the product and will dig into the product if not used correctly. They are made to order and are highly sensitive to the size of the machined channel matching the OD of the catheter exactly. Some skivers do not have a guard over the tooth and if one slips out of the heat shrink it can stab the operator if not careful. Thus, while various manual cutting tools for various purposes have been available heretofore, there has not been a tool that is specifically adapted for this purpose while avoiding possible injury to the user.

A need has thus arisen for a new and improved skiver for precisely and safely removing a thin layer of heat shrink or other similar material from products such as medical catheters, small batteries and the like without risking injury or damage.

SUMMARY OF THE INVENTION

The present invention comprises a new and unique skiver of improved construction which overcomes the foregoing and other difficulties associated with the prior art. In one embodiment in accordance with the invention there is provided a skiver with a body attached to the front end of a handle. A longitudinal recess is provided in the lower surface of the skiver body for guiding a catheter or the like past a transverse blade extending into the top of the recess as the skiver is advanced along the length thereof to precisely remove a thin layer of outside material such as plastic heat shrink without damaging the underlying catheter. In another embodiment of the invention the body of the skiver is attached to a table or other mounting system so that the skiver is supported either on a flat work surface or a separate mount. In another embodiment of the invention, a more automated skiver is provided. The skiver body is held in position and powered rollers advance the catheter or other object into the skiver. This embodiment is safe and efficient and protects the user from injury.

In the present invention, the precise placement of the blade as well as the angle of the blade allows the blade depth to be set to about half of the wall thickness of the material to be removed. When moving the tool along the length of the device (or moving the device along the tool), the blade will want to dig in deeper (due to angle of approach) and, in some instances, will lift (stretch) the heat shrink off of the part and cut off a strip of material allowing the remaining heat shrink to simply be pulled off the part. In contrast to prior devices which merely slice the material to be removed, the devices and methods of the present invention remove a section of the heat shrink.

In some embodiments, a skiver comprises a body having front and back ends and top and bottom surfaces. A longitudinal recess of a predetermined cross section is defined by the body. An opening in the body extends from the bottom surface to the recess. A blade is disposed in the opening. A pair of motorized rollers are arranged to move an object oriented in the longitudinal recess.

In some embodiments, a skiver comprises a body comprising a top surface, a bottom surface and a magnet. The bottom surface comprises a longitudinal recess and the top surface defines a blade recess. The magnet is adjacent to the blade recess. The body comprises an opening between the longitudinal recess and the blade recess. A blade is oriented in the blade recess. The blade comprising a cutting edge and a portion of the cutting edge is positioned in the opening. A cover is attached to the body, which comprises a lower surface. The top surface of the body and the lower surface of the cover secure the blade directly adjacent to the cutting edge.

In some embodiments, a skiver comprises a body comprising a longitudinal recess, a blade recess and an opening between the longitudinal recess and the blade recess. A blade is oriented in the blade recess. The blade comprises a cutting edge and a portion of the cutting edge is positioned in the opening. A cover is attached to the body that is arranged to secure the blade. A guide member is moveable with respect to the body. In some embodiments, a portion of the guide member extends into the longitudinal recess. In some embodiments, the guide member is positioned across the longitudinal recess from the blade. In some embodiments, the guide member comprises a guide pin, the body comprises a cavity and a portion of the guide pin is oriented in the cavity. In some embodiments, the guide member is moveable with respect to the body along a length of the guide pin. In some embodiments, the longitudinal recess comprises a longitudinal axis and the guide member is arranged to move orthogonal to the longitudinal axis. In some embodiments, a drive system is arranged to move an object oriented in the longitudinal recess.

In some embodiments, a skiver comprises a body comprising a top surface, a bottom surface and a central axis. The bottom surface comprises a longitudinal recess. The top surface defines a blade recess. The body comprises an opening between the longitudinal recess and the blade recess. A blade is oriented in the blade recess. The blade comprises a cutting edge and a portion of the cutting edge is positioned in the opening. A cover is attached to the body that comprises a lower surface. The top surface of the body and the lower surface of the cover secure the blade directly adjacent to the cutting edge and the longitudinal recess is laterally offset from the central axis. In some embodiments, the skiver comprises a second longitudinal recess extending parallel to the first longitudinal recess. In some embodiments, the central axis is centered between the first longitudinal recess and the second longitudinal recess.

BRIEF DESCRIPTION OF THE DRAWINGS

A better understanding of the invention can be had by reference to the following Detailed Description in conjunction with the accompanying Drawing, wherein.

DETAILED DESCRIPTION

Figure 1:
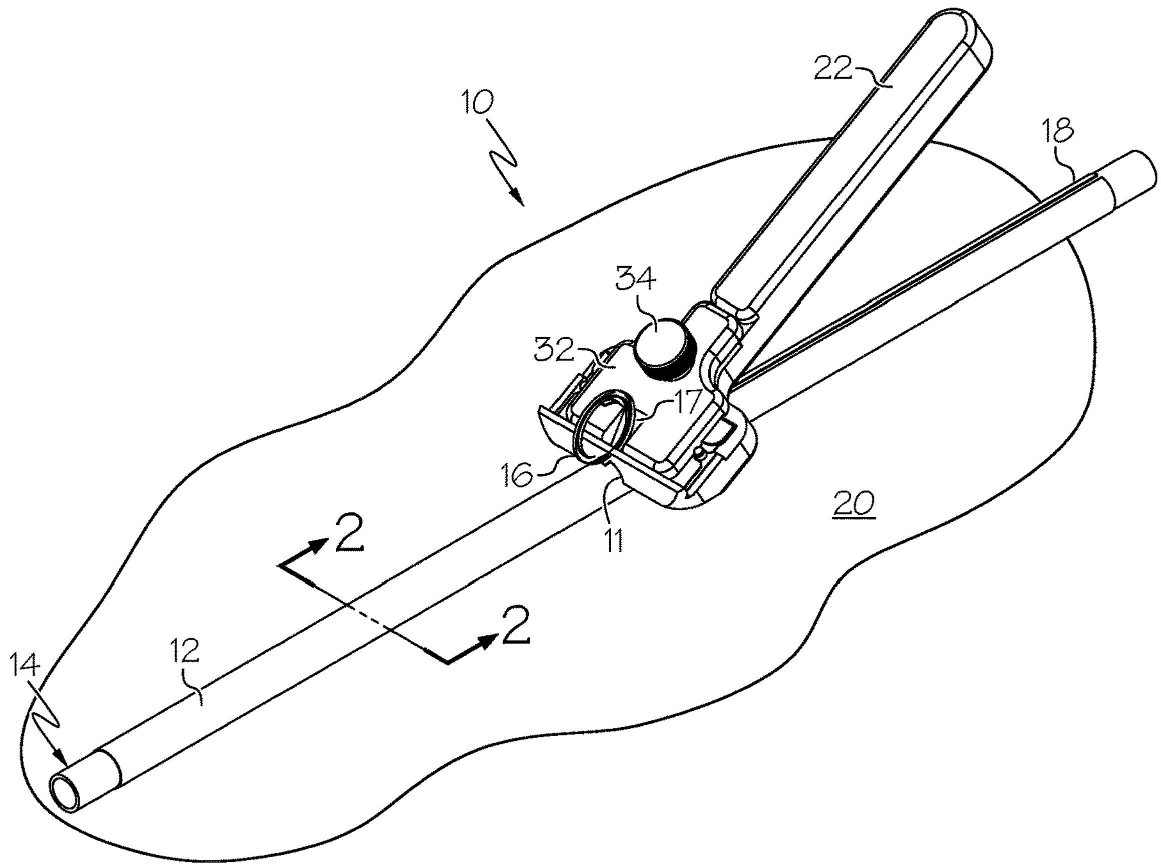
FIG. 1 is a perspective view of the improved skiver according to a first embodiment of the invention herein.
Figure 2:
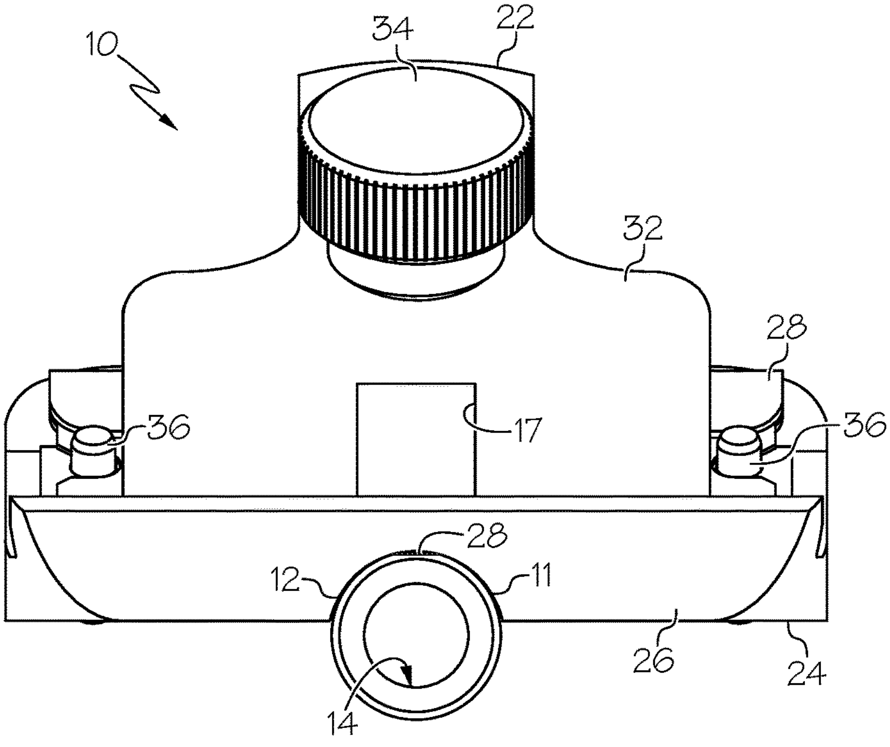
FIG. 2 is an enlarged cross-sectional view taken along lines 2-2 of FIG. 1 in the direction of the arrows.
Figure 3:
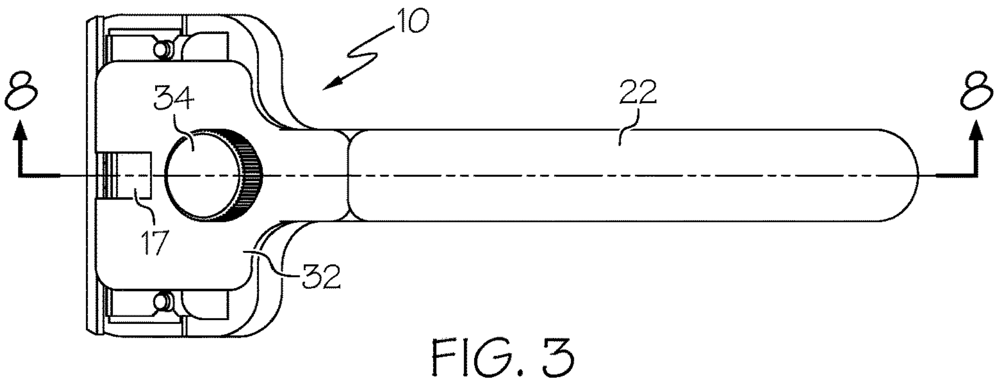
FIG. 3 is a top view thereof.
Figure 4:
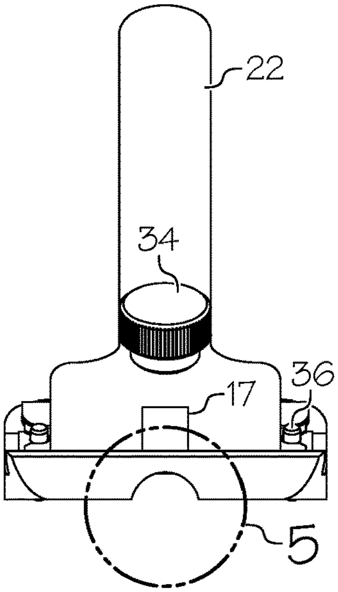
FIG. 4 is a front view thereof.
Figure 5:
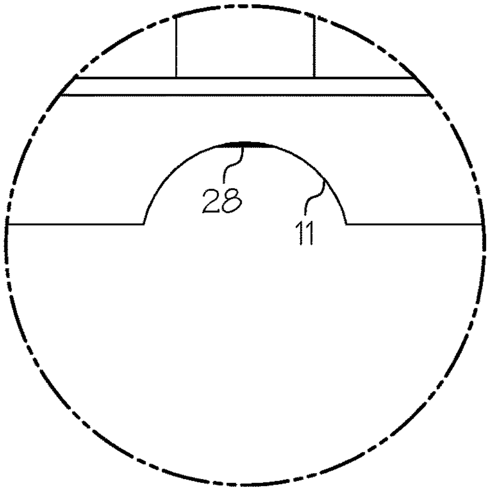
FIG. 5 is a detail view of a portion of FIG. 4.
Figure 6:
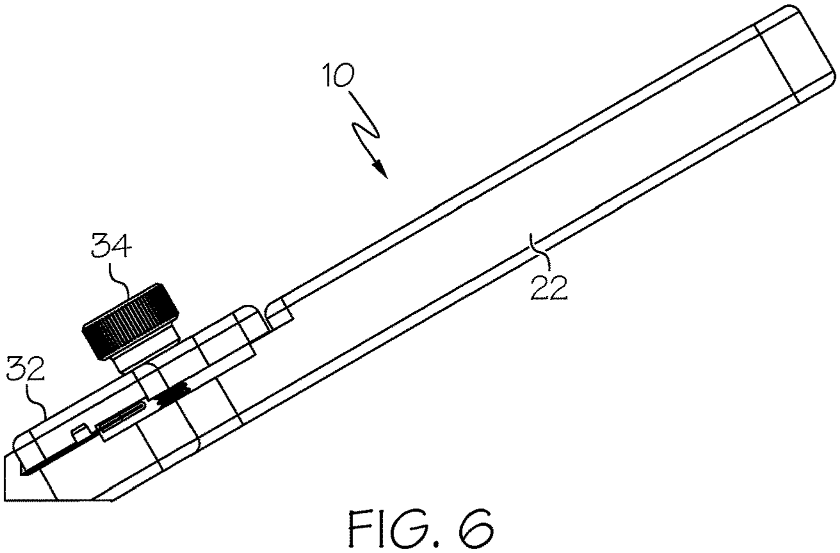
FIG. 6 is a side view thereof.

Referring now to the Drawings, wherein like reference numerals designate like or corresponding elements throughout the views, FIGS. 1-10 show a skiver 10 incorporating a first embodiment of the invention. The skiver 10 can be used to remove a thin layer of material 12, such as plastic heat shrink, from the outside of a catheter or other device 14. A longitudinal recess 11 is provided in the bottom of skiver 10 for receiving the catheter 14. While the recess 11 is shown as a semicircular cross section, other cross sections, including oval or square (a 90° angle or flat), can be used. As the skiver 10 is advanced along the length, the material 12 is lifted off the catheter 14 by the blade and removed in a strip 16 that curls out of an opening 17 in the top of the skiver 10, leaving a longitudinal opening or slot 18 so that the rest of the outer layer of material can then be easily stripped away prior to next process during manufacturing.

When the skiver is used, the catheter 14 can be supported either on a flat work surface 20, or in a separate accessory as described below for better precision and in order to avoid possible injury to the user. As the tools of the present invention are safer than prior art skivers and the accessory can aid in the training of the people who will use the skiver by holding the tool at the correct angle while applying no (or very little) downforce.

The skiver 10 includes a body with handle 22 extending from its back end. The surface of handle 22 may be ribbed or textured to facilitate secure gripping by the user. The front end of the body of skiver 10 is relatively wider than handle 22, with a substantially flat or planar bottom surface 24 and an inclined flat front surface 26 in which the longitudinal recess 11 is located. Front surface 26 is preferably angled upward at an acute angle from surface 24. While various shapes can be used, the recess 11 is preferably semi-cylindrical in shape. The recess is dimensioned in accordance with the size of catheter 14 but the inventions herein allow some leeway. In a non-limiting example, the cross section can have a semicircle diameter of 0.185 inches. This cross section will accommodate a catheter or other device with diameters ranging from 0.075 to 0.18 inches. The catheter has to be slightly smaller than the cross section so that the surface of the material to be removed can touch the blade but can also be substantially smaller than the cross section. If the catheter is sized too much smaller than the cross section, the catheter may be unstable when moving past the blade.

Figure 9:
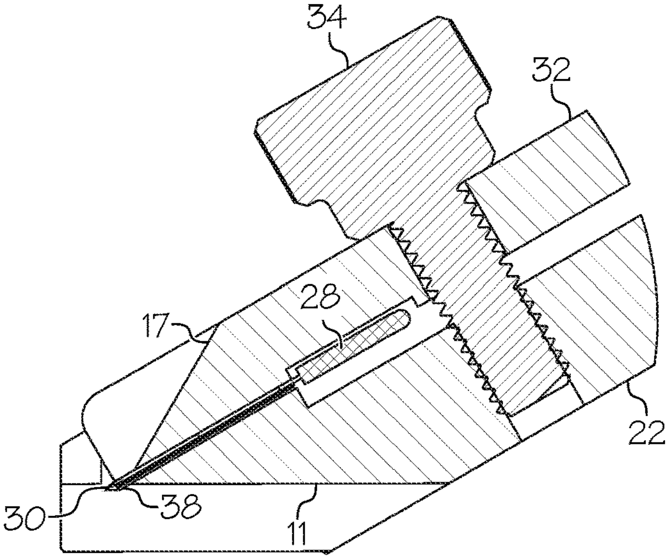
FIG. 9 is an enlarged, detail view of a portion of FIG. 8.

A blade 28 is disposed in a transverse recess in the top of the front end of handle 22, the middle front position of which top recess intersects bottom recess 11, forming a small opening 30. The cutting edge of blade 28 extends into the opening 30, as best seen in FIG. 9. As shown, blade 28 can be a single edge safety razor of the type used in shaving, although other types of blades could also be used, if desired.

The blade 28 is preferably set at an angle of about 30 degrees from horizontal as shown, plus or minus about three to five degrees. From the view in FIG. 1, to operate the skiver, the user will push on handle 22 so that catheter 14 and material 12 move toward the blade end of skiver 10. Of course, the skiver can be held stationary, and the catheter moved toward the blade end of the skiver, or both can be moved at the same time.

The blade 28 is secured beneath a removable cover 32 by a thumb screw 34 to the front end of handle 22 so that it can be replaced as necessary. A pair of laterally spaced apart dowel pins 36 are provided in the top recess for accurate alignment of blade 28.

The depth of extension of blade 28 into the opening 30, and thus the depth and width of the cut can be adjusted by means of shims or height adjustment elements 38, two of which are shown for purposes of illustration, although any suitable number can be used. The shims 38 can be made from stainless steel or any other suitable material in thicknesses ranging from two to ten thousandths of an inch each. In some embodiments, the shims have a small notch located on the side that is adjacent to the sharp end of blade 28. See FIGS. 9 and 10. Therefore, depending upon the thickness of outside material 12, the blade 28 can be set precisely to remove material to a depth of less than one to more than fifteen thousandths of an inch of material.

Figure 10B:
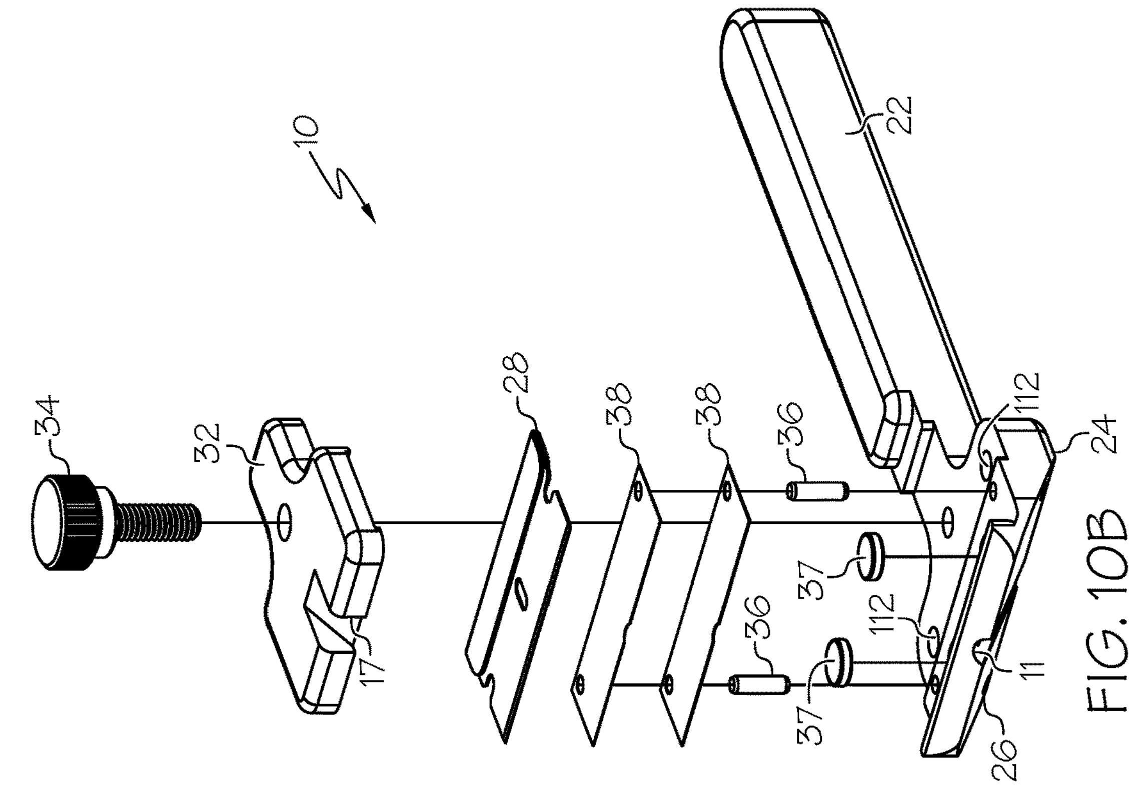
FIGS. 10A and 10B are an exploded view of the skiver herein.
Figure 10A:
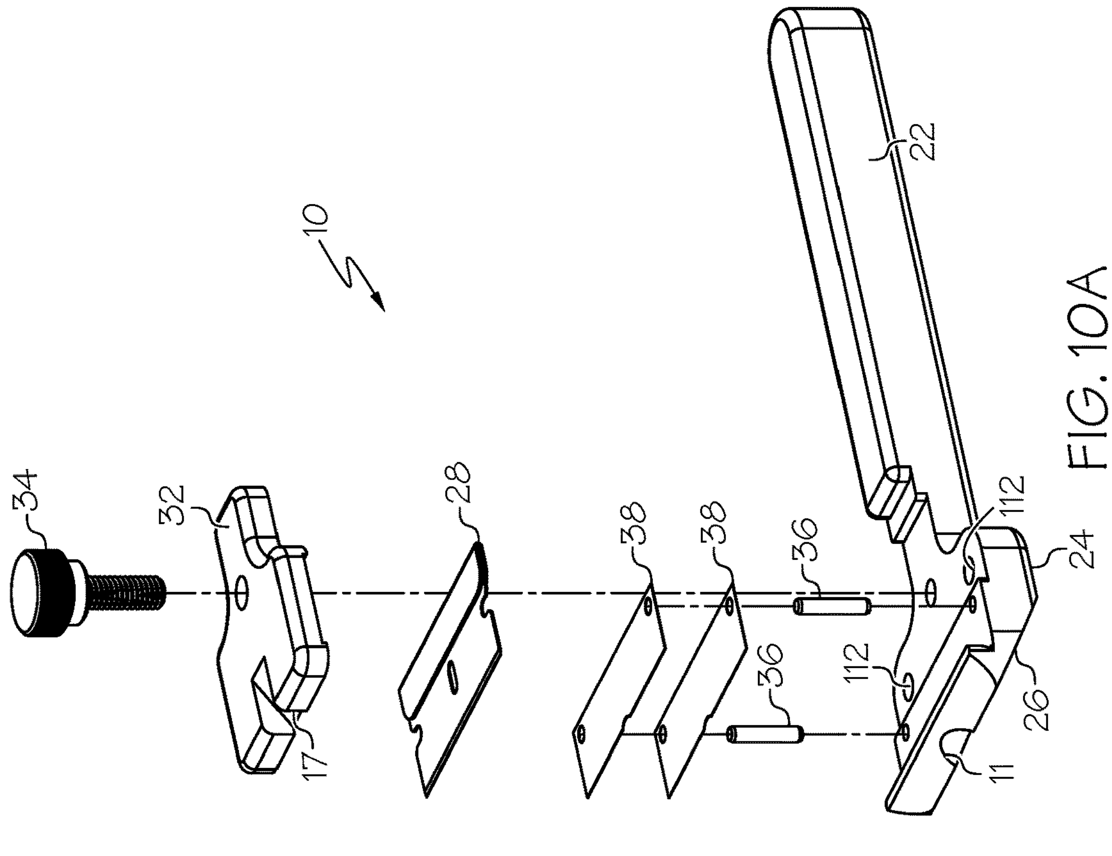

FIG. 10B is similar to FIG. 10A with the exception of magnets 37. The one or more magnets 37 are placed in the raised section of handle 22 that extends under removable cover 32. When placing (or replacing) blade 28 and optional shims 38 onto skiver 10, the openings in option shims 38 and blade 28 are aligned with dowel rods 36. Due to manufacturing tolerances, the blade may not be in its optimal position and must be pushed toward the opening that extends into recess 11 before attaching removable cover 32. As the position of the magnets is toward one end of optional shims 38 and blade 28, the magnetic force will pull optional shims 38 and blade 28 toward the opening as the magnets try to move toward the middle of the overlying structures. This force pulls the blade to be centered on the magnets which automatically loads it to the correct position. In some embodiments, the openings in shims 38 and blade 28 are such that, when the openings therein are positioned around dowl rods 36, they cannot be placed in the incorrect orientation as they will not fit.

Figure 11:
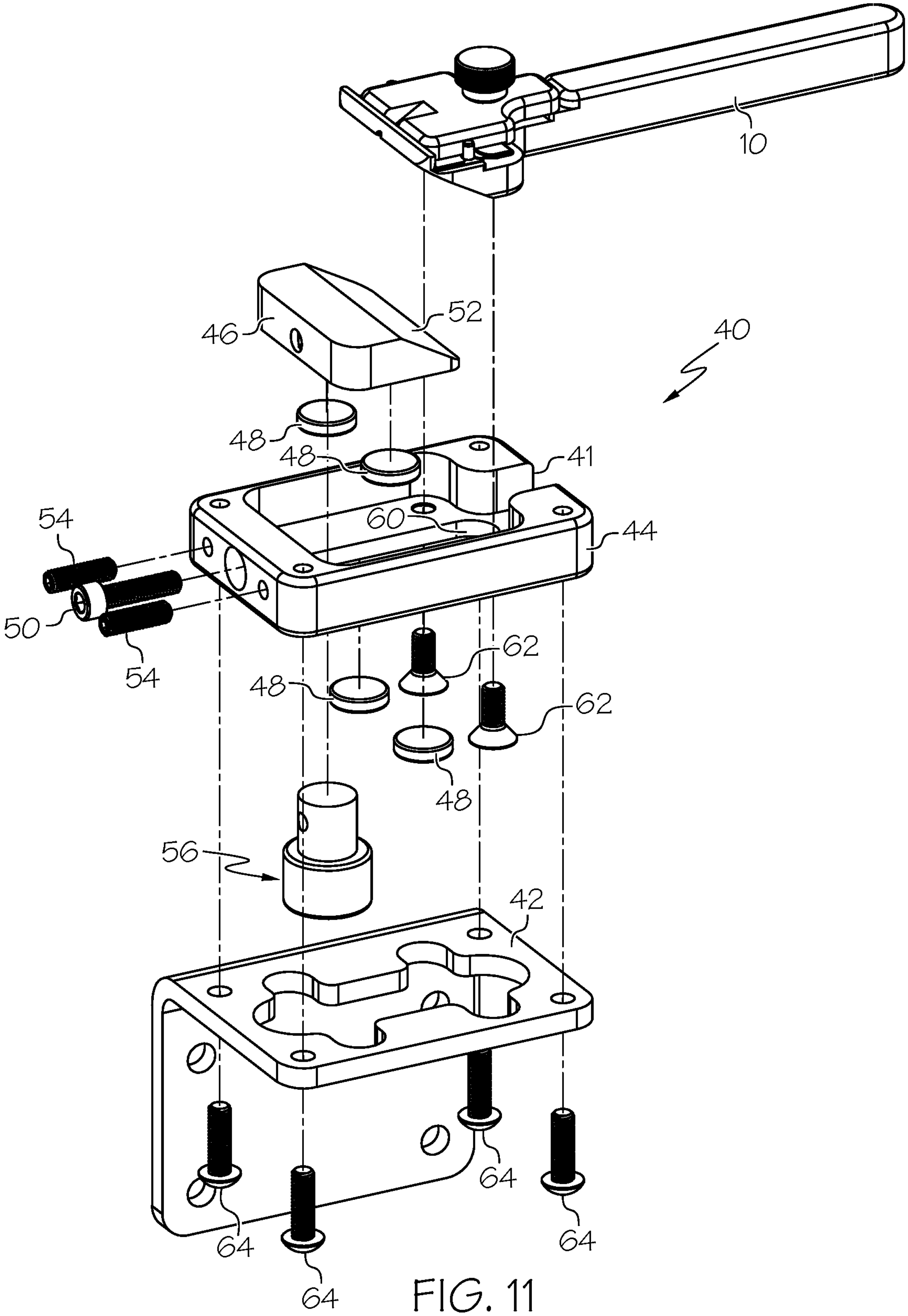
FIG. 11 is an exploded view of an optional handheld accessory and an optional mounting bracket.

FIG. 11 shows an optional way of using skiver 10 instead of directly on a work surface 20. A separate mount 40 is shown which can be either handheld or placed in a bracket 42 attached to a wall or the side of a table. The mount 40 includes a generally rectangular hollow base 44 with an opening 41 in one of the walls. A slidable jaw 46 is provided in an opening in the top of base 44, biased toward skiver 10 by magnets 48 in slidable jaw 46 and base 44. The magnets are positioned so that opposite poles face each other. The aligned magnets are offset to induce a force that moves jaw 46 toward skiver 10. Bolt 50 extends through the end of mount 40 and through an opening in jaw 46 and is threaded into knob 56. These threads do not engage base 44 or jaw 46. The head of bolt 50 can be used to set a limit how close jaw 46 can get to skiver 10. The end of jaw 46 that faces the skiver 10 has an angled flat surface 52 complementary to surface 26 of handle 22. Optional set screws 54 can also be used along with screw 50 to set gap to a known distance for skiving a device with a consistent cross-sectional diameter.

Button 56 can be used to move jaw 46 away from skiver 10 to aid in inserting a catheter or other device into the skiver. If not attached to bracket 42, the user can hold the assembly in one hand while pulling the catheter or other object through the skiver and out opening 60.

After the blade depth has been adjusted as desired, the skiver 10 can then be secured within mount 40 by bolts 62 before or after being secured to bracket 42 by bolts 64, as desired.

Figure 12:
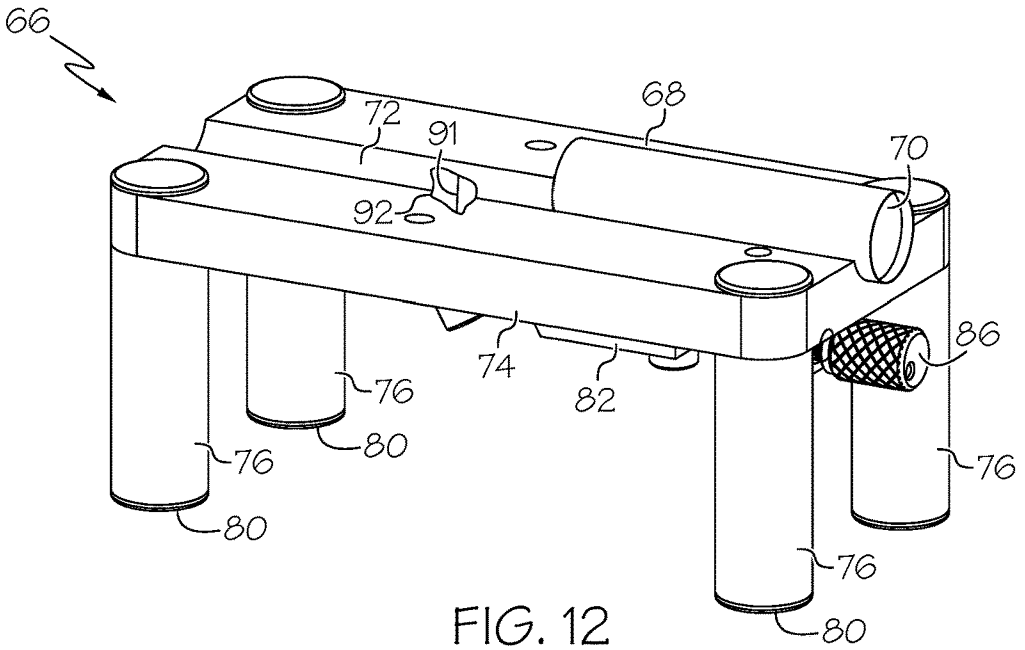
FIG. 12 is a perspective view of the improved skiver according to another embodiment of the invention herein.
Figure 13:
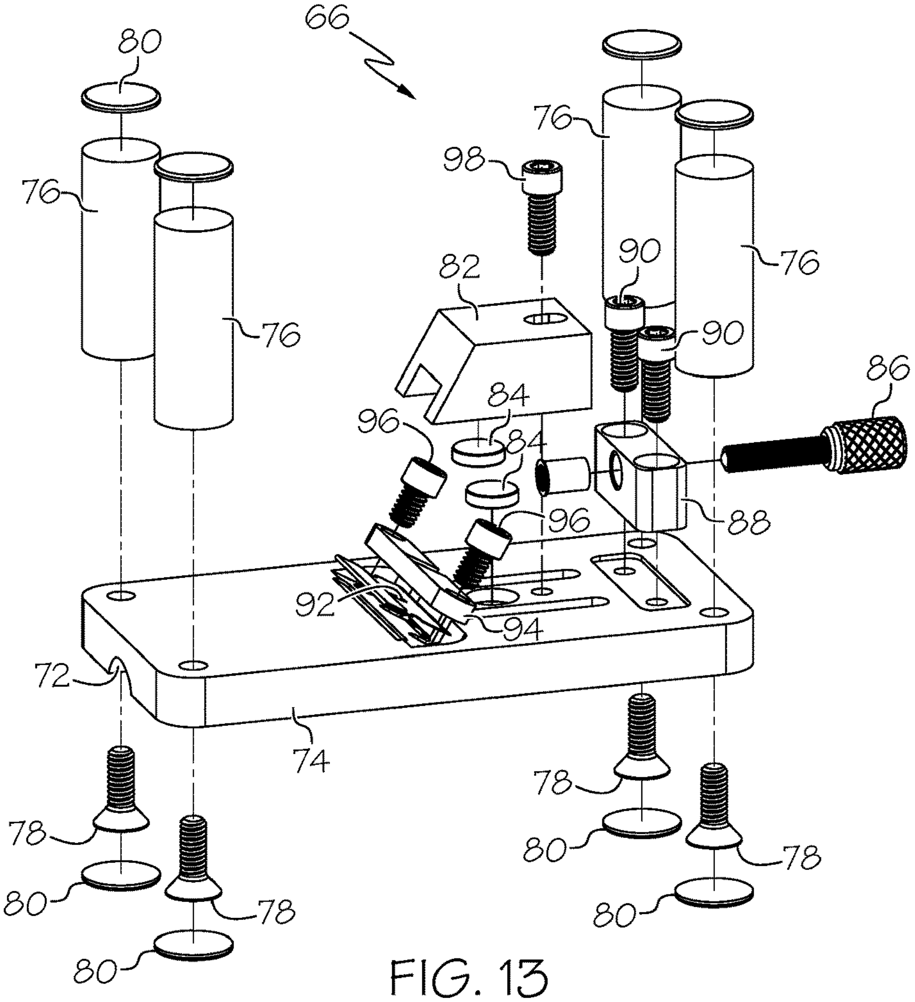
FIG. 13 is an inverted, reverse exploded view of the embodiment of FIG. 12.
Figure 14:
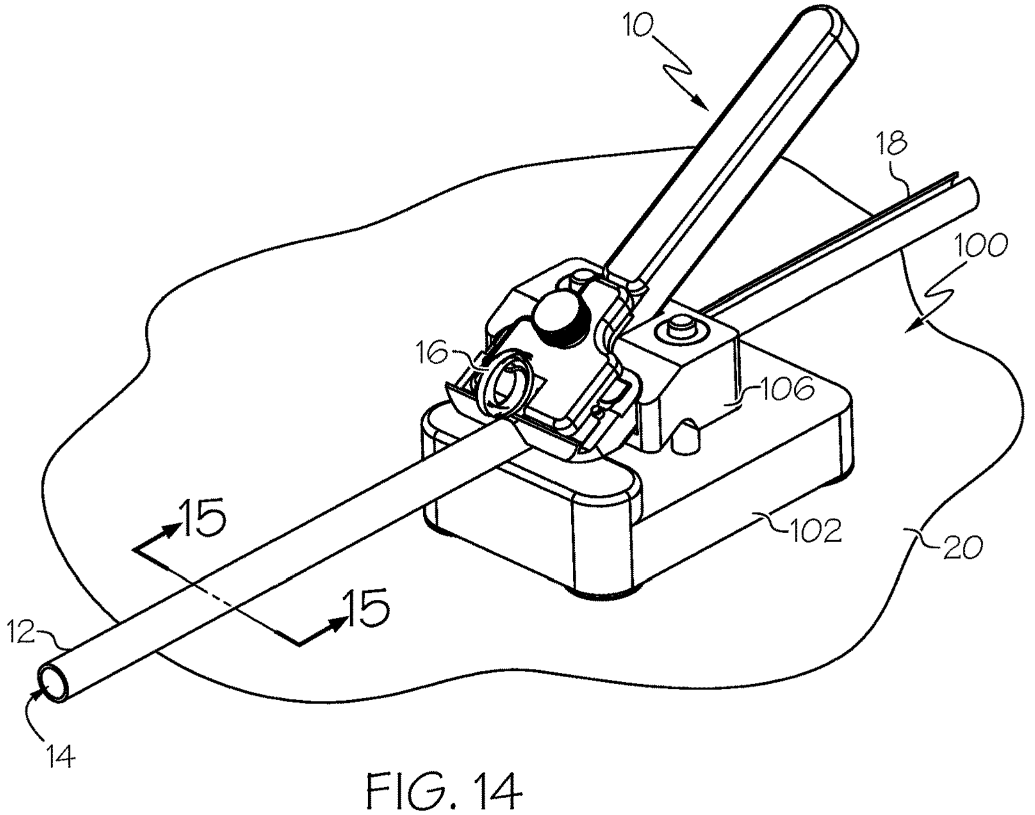
FIG. 14 is a perspective view showing an optional bench top accessory for use with the skiver herein.
Figure 15:
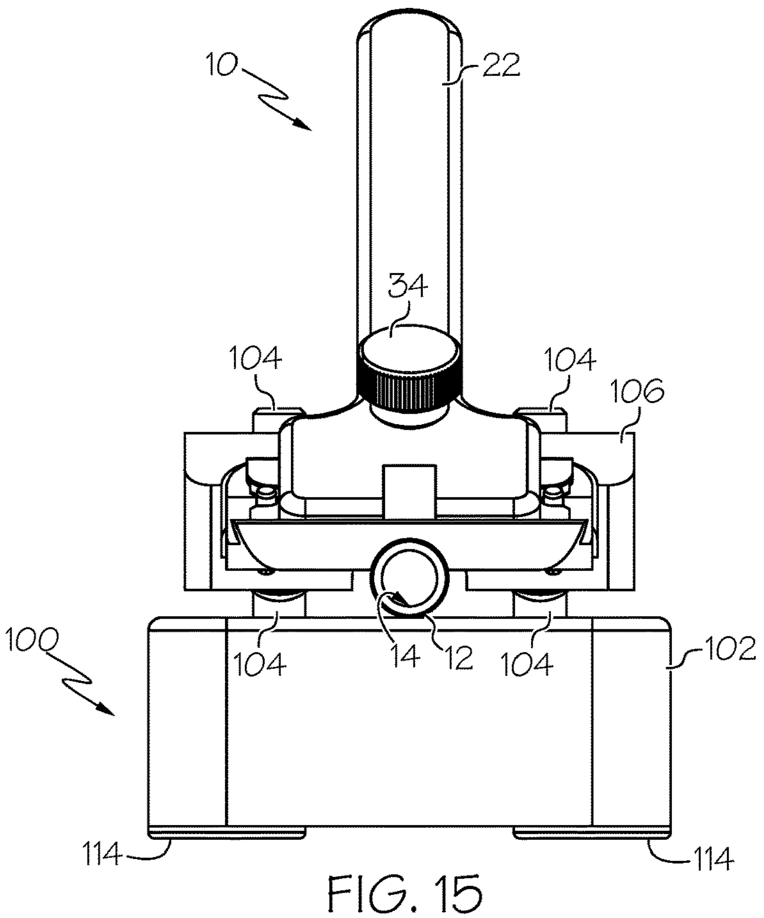
FIG. 15 is an enlarged cross-sectional view taken along lines 15-15 of FIG. 14 in the direction of the arrows.
Figure 16:
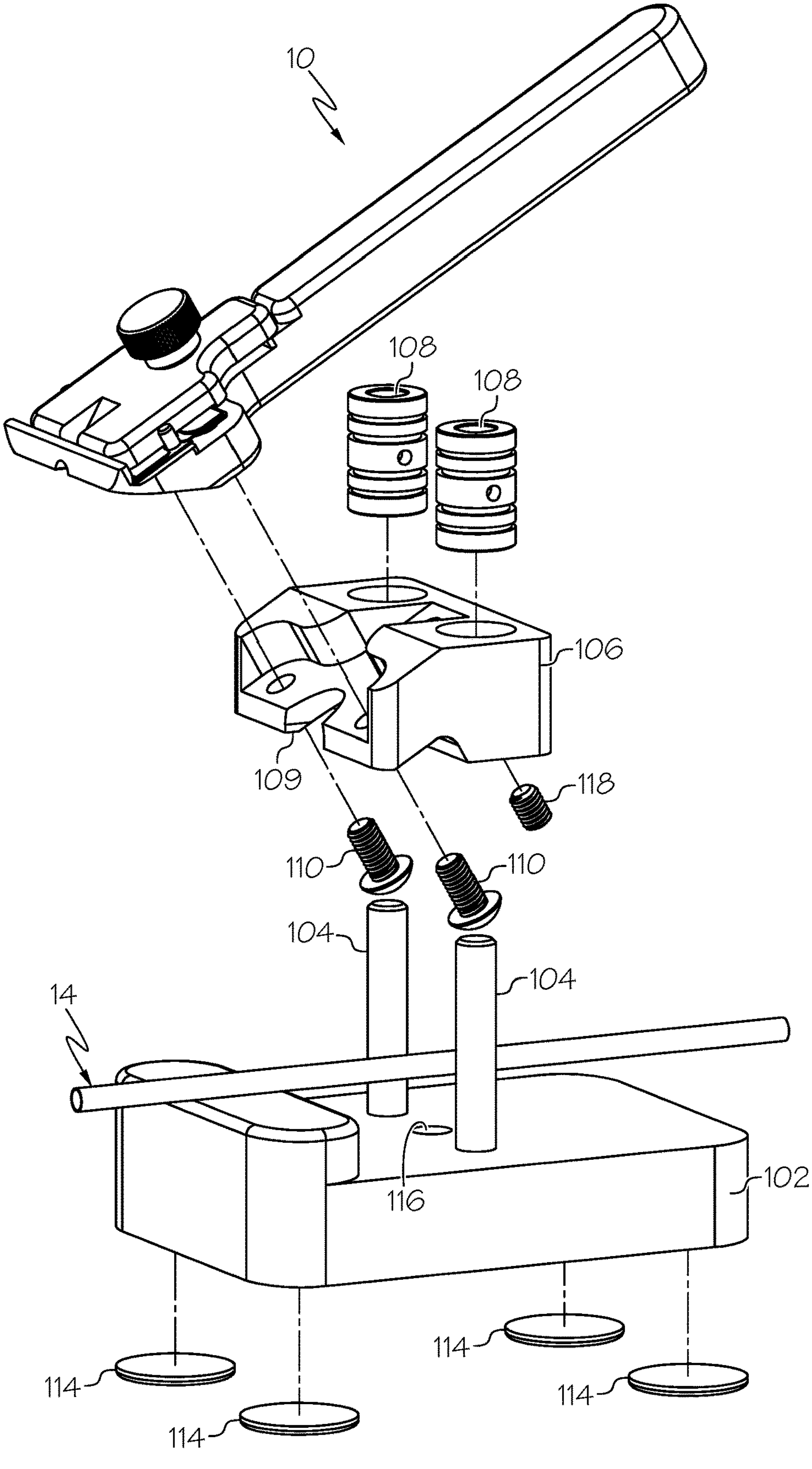
FIG. 16 is an exploded view of an optional table or bench top accessory.

FIGS. 12 and 13 show a skiver 66 incorporating a second embodiment of the invention for removing a thin layer of plastic heat shrink material 68 from the outside of a relatively short elongate device, such as a battery 70. In this embodiment, the elongate product or battery is slidable along a semi-cylindrical top recess 72.

Skiver 66 includes a raised body 74 supported on legs 76 secured thereto by screws 78. Rubber feet 80 are provided on at least the bottom ends of legs 76.

The underside of body 74 includes a slidable adjustment block 82 guided within recesses and biased by magnets 84, as shown in FIG. 13. A screw 86 is provided for fine adjustment. Screw 86 extends through a block 88 secured by bolts 90 to the bottom of body 74.

A blade 91 is provided on the angled side of an opening 92 extending through body 74, held in place by a cover 94 secured with screws 96. A portion of opening 92 intersects with the longitudinal recess 72. With screw 86, the blade 92 and cover 94 can be set in the desired position with the edge of the blade extending though opening 92 and into recess 72, after which the adjustment block 82 is locked in place with screw 98.

Again, blade 91 is preferably set at an acute angle of about 30 degrees, or about 25 to 35 degrees, of inclination so that battery 70 can then be advanced across skiver 66 to quickly cut a longitudinal section in the heat shrink material 68 and thus facilitate its removal from the battery.

Figure 17:
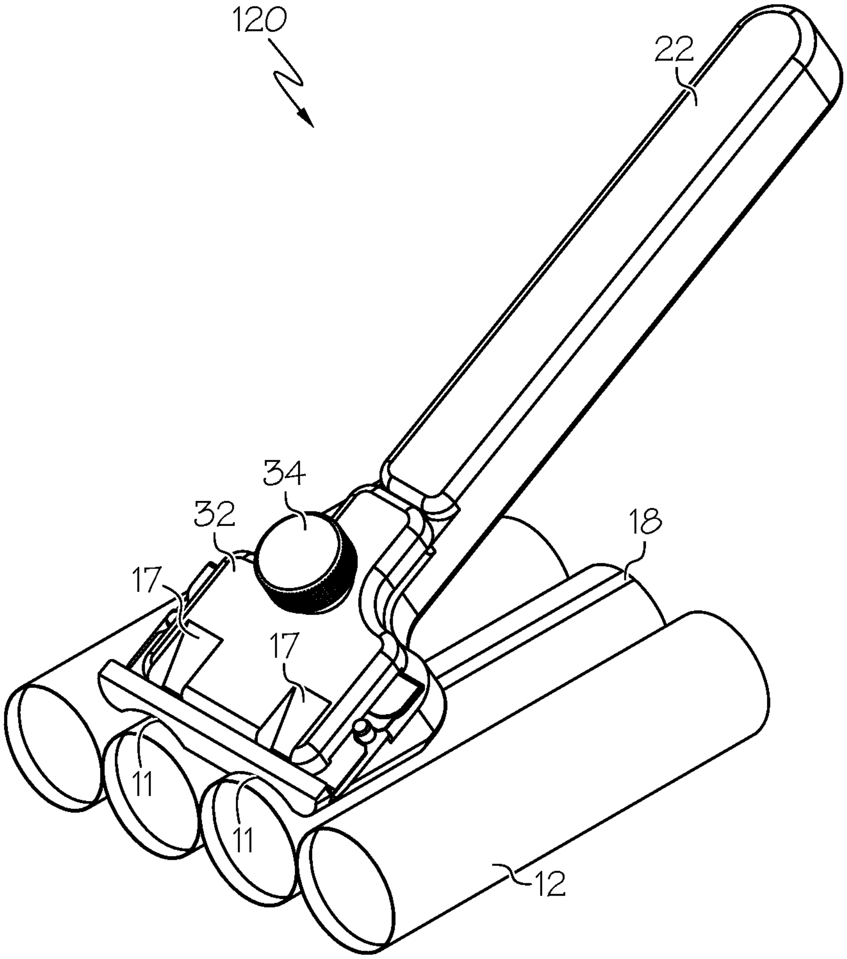
FIG. 17 is another embodiment of the invention.
Figure 18A:
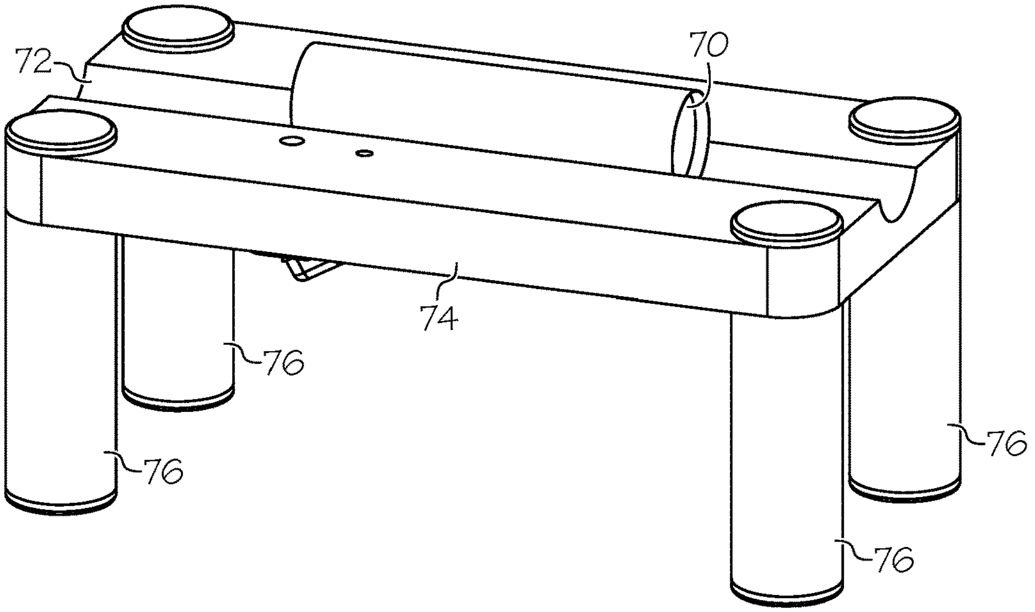
FIGS. 18A and 18B are another embodiment of the device shown in FIGS. 12 and 13.
Figure 18B:
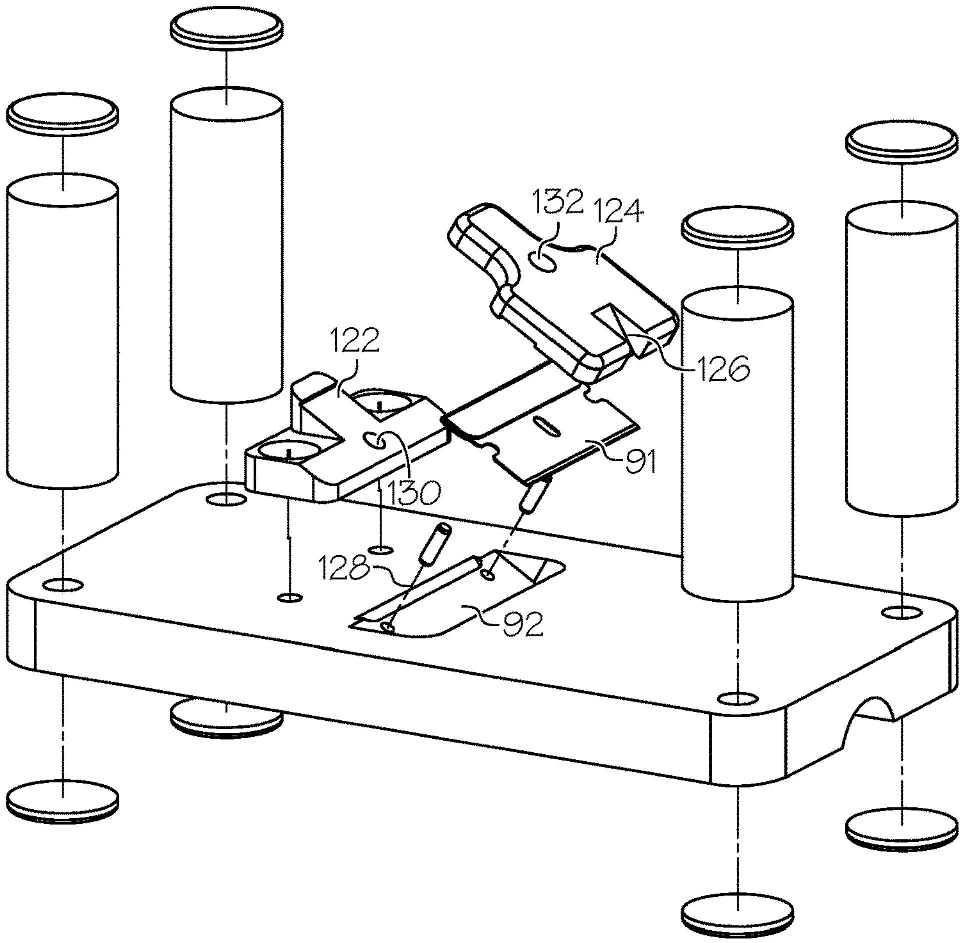

FIGS. 18A and 18B show an alternative to the embodiment shown in FIGS. 12 and 13. Here, instead of a slidable adjustment block 82 and adjustment screw 86, a block 122 is secured to the bottom of body 74 adjacent to opening 92. A portion of opening 92 intersects with the longitudinal recess 72. A blade 91 is provided on the angled side of an opening 92 extending through body 74, held in place by a cover 124. Both blade 91 and cover 124 have openings that are aligned with dowls 128 to hold the blade and cover in the proper orientation. The depth that the blade 91 extends into recess 72 can be controlled by using shims or spacer elements (not shown) positioned between blade 91 and the surface of opening 92. A screw, not shown, will extend through opening 132 in removeable cover 124 and into opening 130 of block 122 to hold the removable cover, blade, and spacing elements (if any) in position. While not shown, the embodiments of FIGS. 17, 18A, and 18B can be constructed with one or more magnets similar to magnet(s) 37 of FIG. 10B or magnet(s) 157 of FIG. 22C FIGS. 14-16 show another optional way of using skiver 10 instead of directly on a work surface 20. The skiver 10 can be used with a mount 100 that includes a generally rectangular body 102 with a raised step at one end. A pair of upright pins 104 are provided on the top of body 102 behind the front step for slidably supporting a block 106 with linear bearings 108 therein on the mount body.

A longitudinal recess 109 is provided in the underside of block 106 for receiving the catheter or other device 14.

Figure 7:
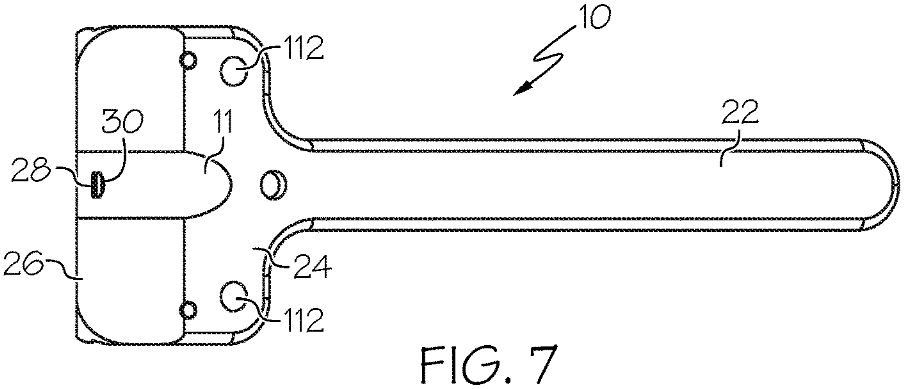
FIG. 7 is a bottom view thereof.
Figure 8:
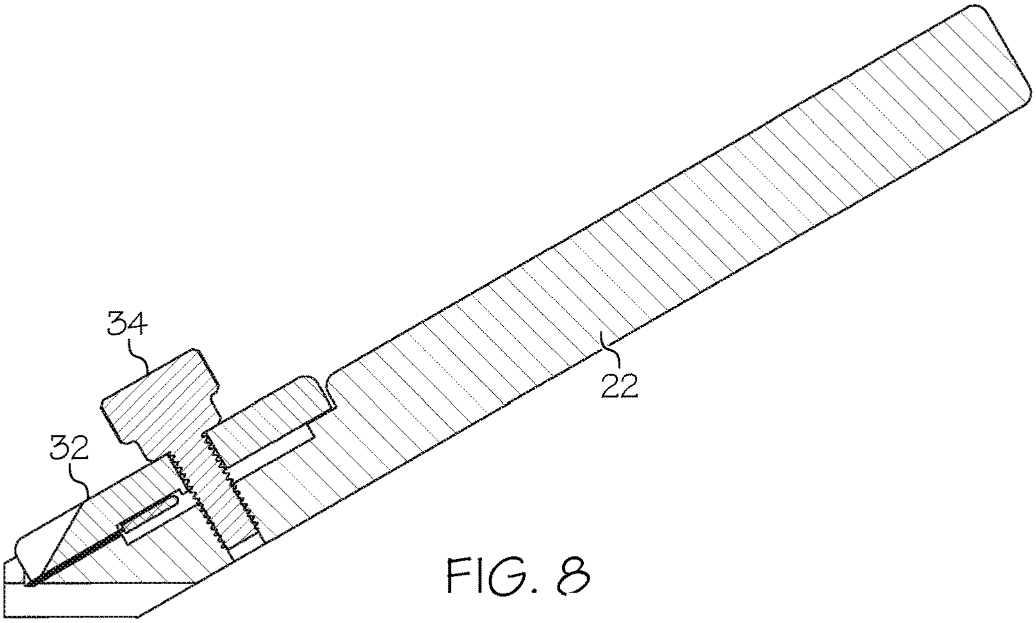
FIG. 8 is a cross-sectional view taken along lines 8-8 of FIG. 3 in the direction of the arrows.

The skiver 10 is threadedly secured to block 106 by screws 110 extending upwardly through openings in the block into holes 112 in the underside of the skiver, as best shown in FIG. 7, for secure positioning as the catheter 14 is advanced under the skiver, over body 102 and underneath block 106 of mount 100.

Rubber feet 114 are preferably provided on the bottom of body 102 to resist sliding of the mount 100. An optional hole 116 can also provide to facilitate positively securing mount 100 to work surface 20 with a bolt (not shown) or the like, if desired.

A set screw 118 is provided for fine adjustment of the angle of the skiver 10 when used with mount 100. The set screw 118 extends upwardly through an opening in block 106 into engagement with the underside of skiver 10 after attachment to the block.

FIG. 17 shows an embodiment of the invention that comprises two skiving locations. This embodiment is similar to the embodiment shown in FIGS. 1-10 except that here there are two recesses 11, two openings for the blade to extend into the recesses, and two openings 17 in the removable cover 32. This embodiment allows the user to form one or two longitudinal openings or slots 18. As shown, the recesses 11 do not line up with the material to be skived-in this case a package of batteries. In some embodiments, the two recesses can be spaced to line up with batteries or other devices in the pack.

Figure 19:
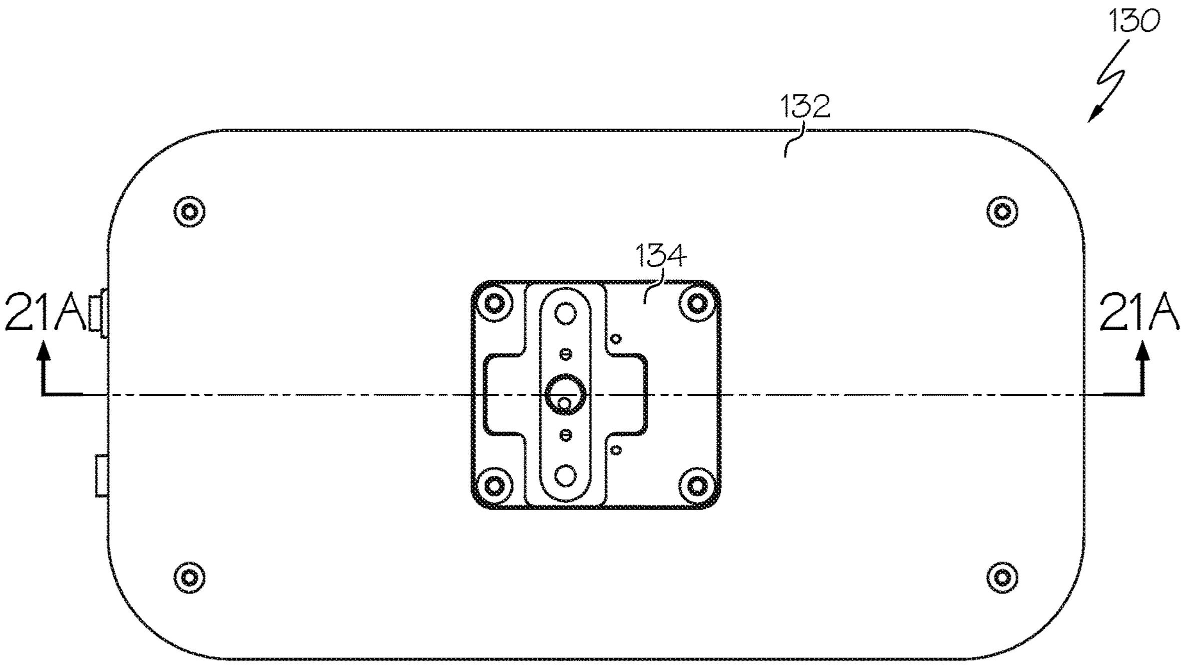
FIG. 19 is another embodiment of the invention.
Figure 20:
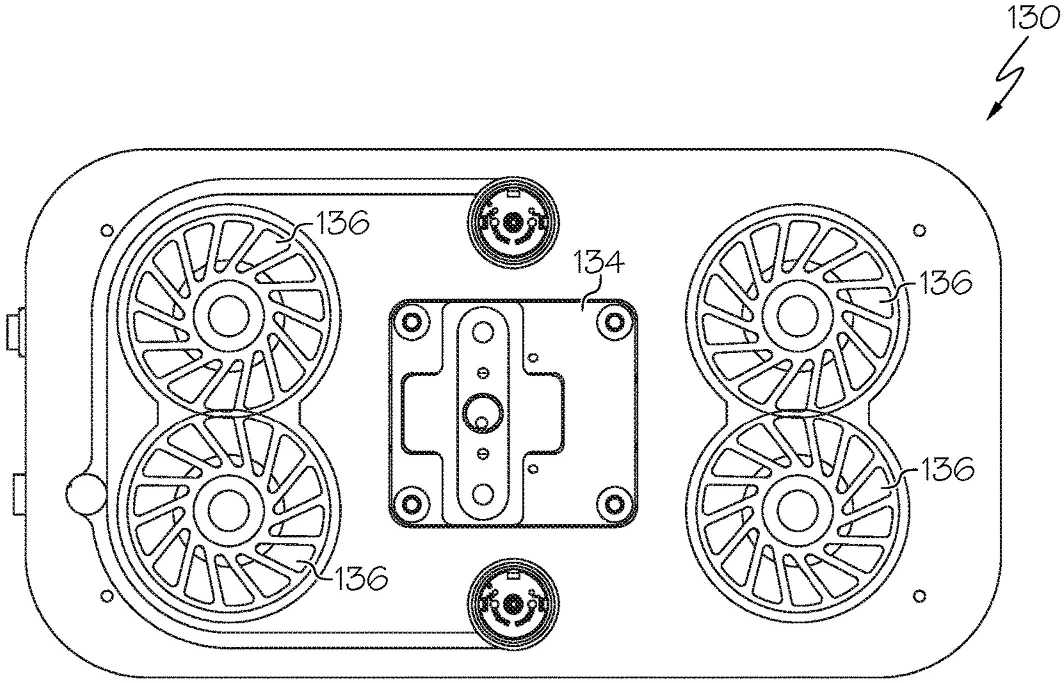
FIG. 20 is a view of an embodiment of the invention.

FIGS. 19 to 24 show a mechanically driven or automatic skiver. FIG. 19 is a top view of this embodiment which shows automatic skiver 130 covered by top plate 132. The tooling apparatus 134 is also shown. FIG. 20 shows automatic skiver 130 with the top plate removed. Here four rollers, 136, are shown, with one pair of rollers positioned at the inlet to tooling apparatus 134 and one pair of rollers positioned at the outlet. Rollers 136 function to draw the catheter or other device into skiver 130, to push the catheter or other device through the tooling apparatus 134, and to pull the catheter or other device out of the tooling apparatus and out of skiver 130. In some embodiments the rollers 136 are no-crush rollers so that the distance between the pairs of rollers does not need to be adjusted. In other embodiments, the distance between the pairs of rollers can be adjusted to accommodate catheters or other devices of different sizes. The rollers can be driven by one or multiple motors. In some embodiments, the skiver will include a power source such an electric cable/plug (not shown) and an on/off switch 137. While not shown in these drawings, in some embodiments a round belt is used to drive the rollers 136. In this embodiment, in the event that the catheter or other device gets stalled or stuck while being skived, the rollers are likely to stop rotating to prevent damage to the catheter or other device. The round belt will slip on a pully that is attached to each roller 136.

Figure 21A:
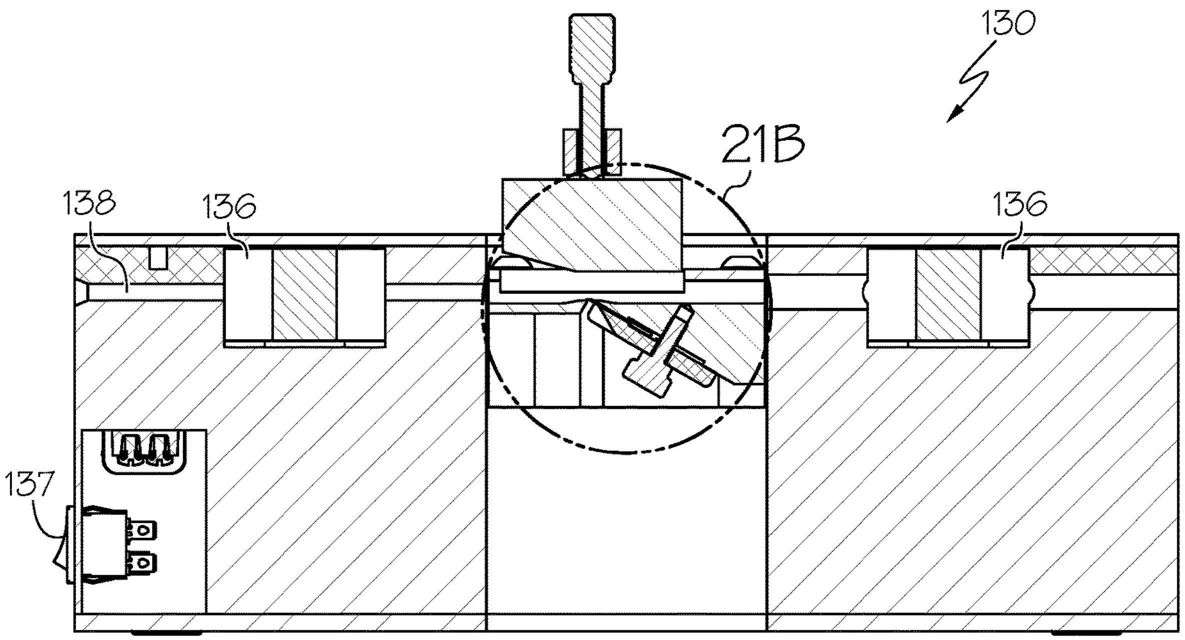
FIGS. 21A and 21B are cross sections of the embodiment shown in FIG. 19.
Figure 21B:
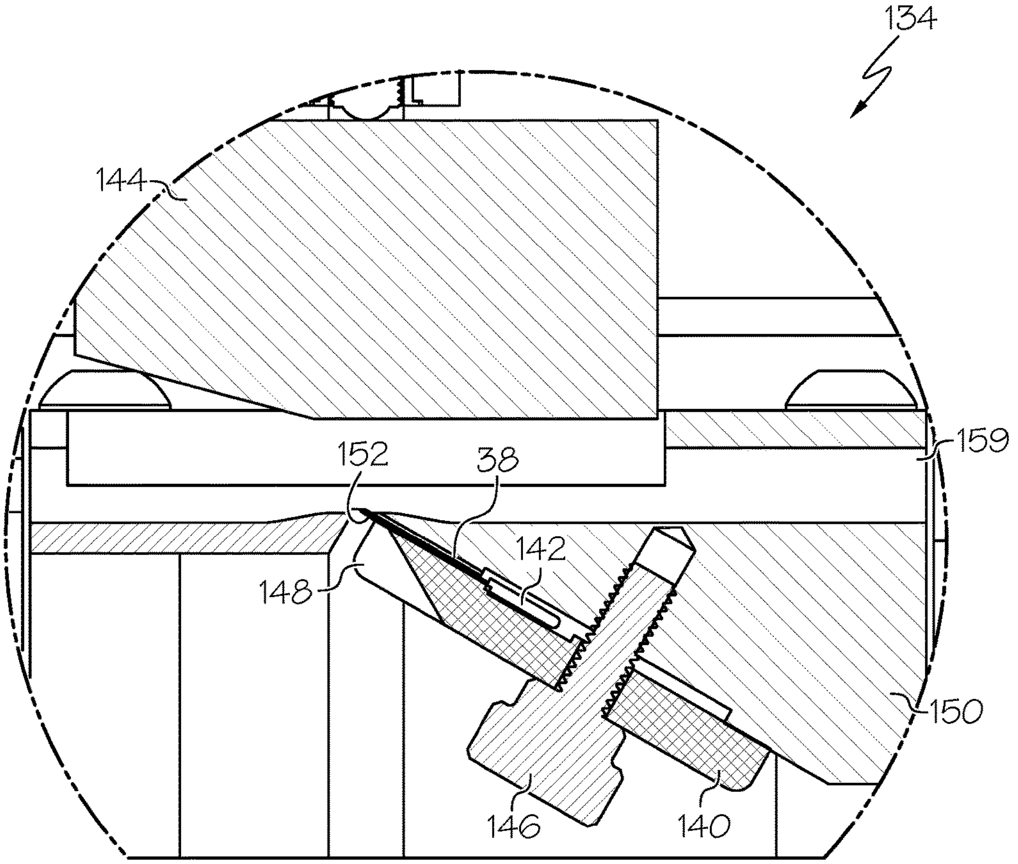

FIGS. 21A and 21B show a cross section of FIG. 19 taken at A-A. In 21A, lumen 138 is shown. Lumen 138 is used to feed a catheter or other device through the skiver 130 to remove an external heat shrink or other thin layer of material. Recess 159, discussed below, is aligned with lumen 138 to provide a pathway for the catheter or other device through skiver 130. FIG. 21B is a detailed view of the tooling apparatus shown in 21A. In FIG. 21B, it can be seen that the tooling apparatus comprises a removable cover 140 secured to body 150 by screw 146. Blade 142 is positioned between cover 140 and body 150. Body 150 has an opening 152 which extends in to recess 159 so that the blade 142 can extend into the recess. In some embodiments, shims or spacer elements 38 can be positioned between blade 142 and body 150 to control the depth that blade 142 extends into recess 159. Guide 144 is positioned on top of body 150. It 'floats' on body 150 in that it is not attached to the body. As will be discussed later, it rides on a pair of guide pins and is held down only by gravity.

Figure 22B:
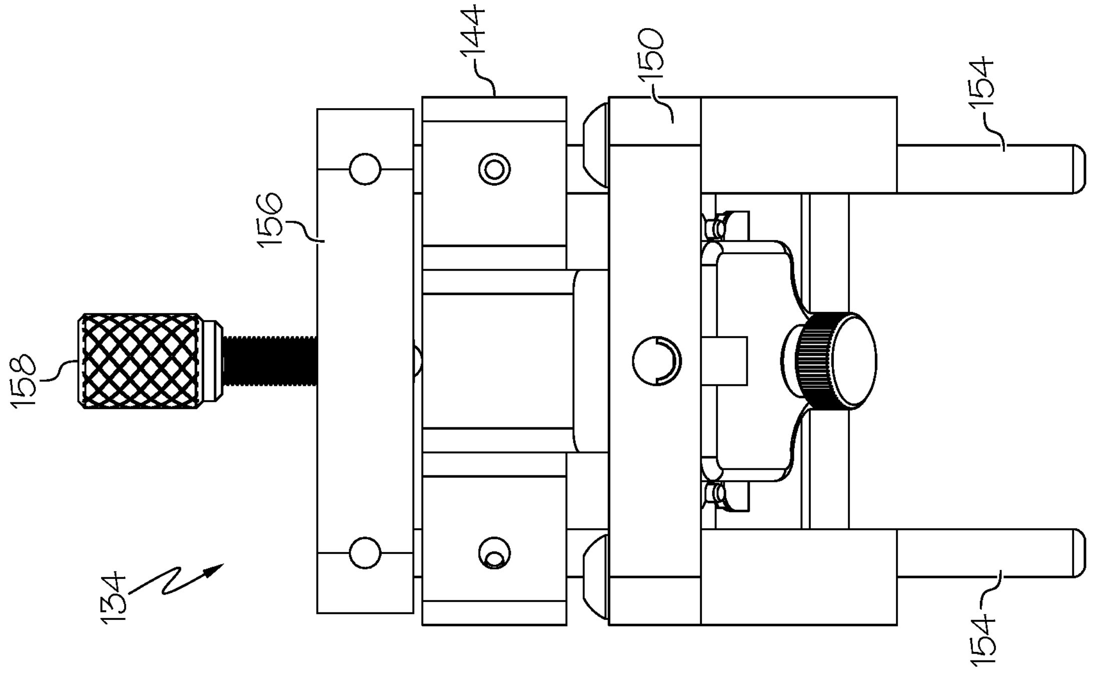
FIGS. 22A, 22B, and 22C are views of a tooling apparatus.
Figure 22A:
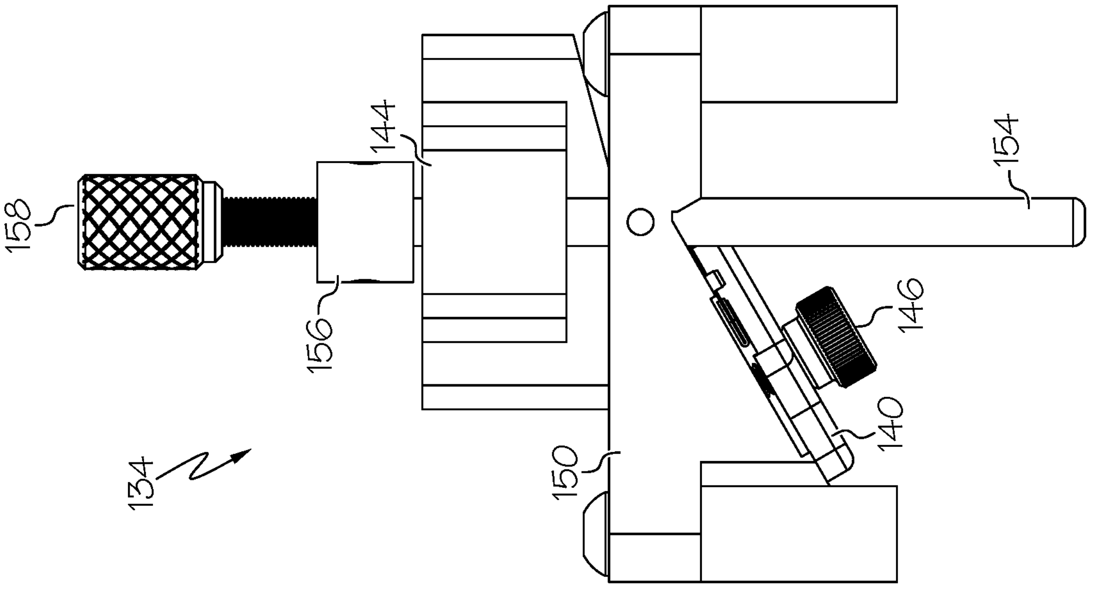

FIG. 22A is a side view and FIG. 22B is a front view of on embodiment of tooling apparatus 134. In this view tooling guide pins, 154, can be seen extending below body 150. When positioned in skiver 130, these guide pins extend into lumens which hold tooling apparatus 134 in place within skiver 130. The guide pins extend upwardly through body 150 and through guide 144. The body is fixed to the guide pins but guide 144 is allowed to float or move up and down on the guide pins. In some embodiments a top hat 156 is positioned on top of guide 144 to provide additional downward force onto guide 144. Top hat 156 has lumens to allow guide pins 154 to extend through the top hat. In some embodiments, top hat 156 is secured to guide pins 154 to provide a top limit to the distance that guide 144 can travel upward on guide pins 154. In some embodiments, top hat 156 includes screw 158. The bottom of screw 158 touches guide 144. By rotating screw 158, the user of skiver 130 can adjust how far up guide 144 can travel. In other embodiments, disc or other magnets are positioned in the top surface of guide 144 and the bottom surface of hat 156. The magnets are positioned such that a pole on one magnet faces a common pole on the opposite magnet. The force of the magnets repelling each other adds a downward force on guide 144. In other embodiments, the force from the top hat 156 onto guide 144 can be adjusted by adjusting the distance from the top hat 156 to the guide 144. The repelling magnetic force between the top hat 156 and guide 144 will be greater the closer top hat 156 is positioned relative to guide 144.

Figure 22C:
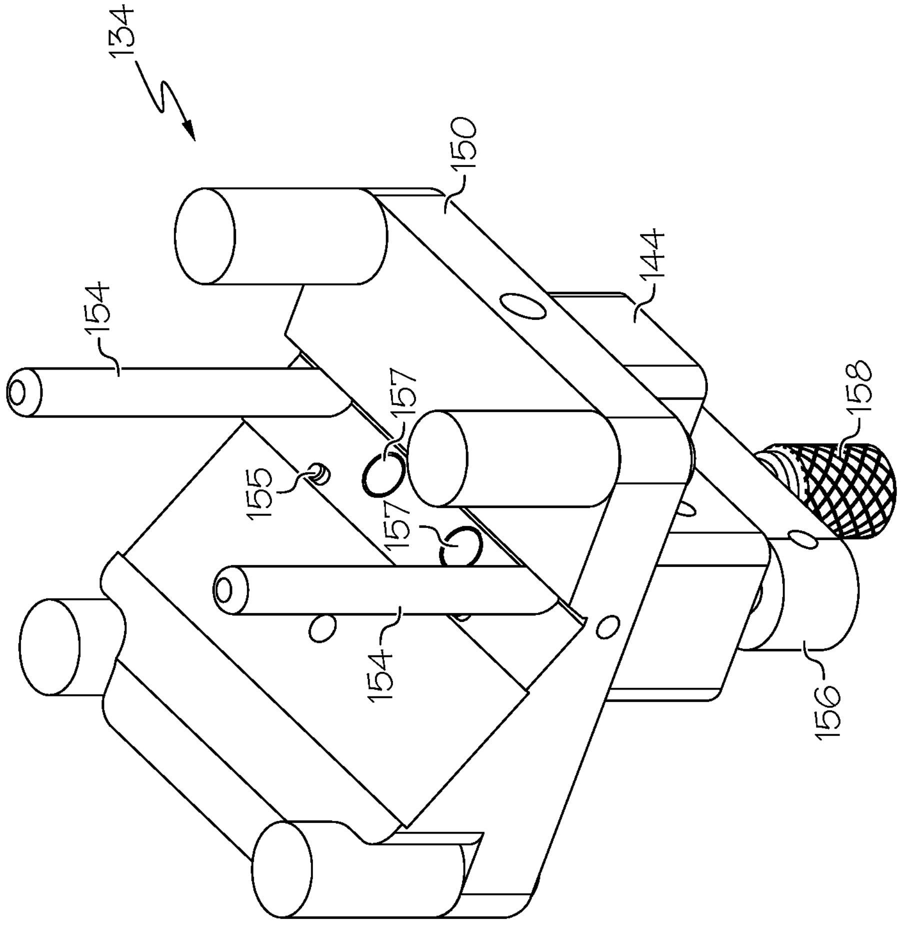

FIG. 22C is a bottom view of an alternative embodiment for tooling apparatus 134. In this view, removable cover 140, screw 146, and blade 142 are removed. Shown here are dowl rods 155 (one is hidden by one of guide pins 154) and one or more magnets 157. The one or more magnets 157 are positioned in the raised section of body 150 that is covered by the removable cover 140. The one or more magnets 157 are positioned near the edge of the raised section that is closest to opening 152. As the magnets are positioned near one end of any optional shims and blade 142, the magnetic force will pull the optional shims and blade toward opening 152 and properly position the blade 142 within the opening 152. To aid in positioning, openings in the optional shims and blade 142 are aligned with dowl rods 155.

Figure 23:
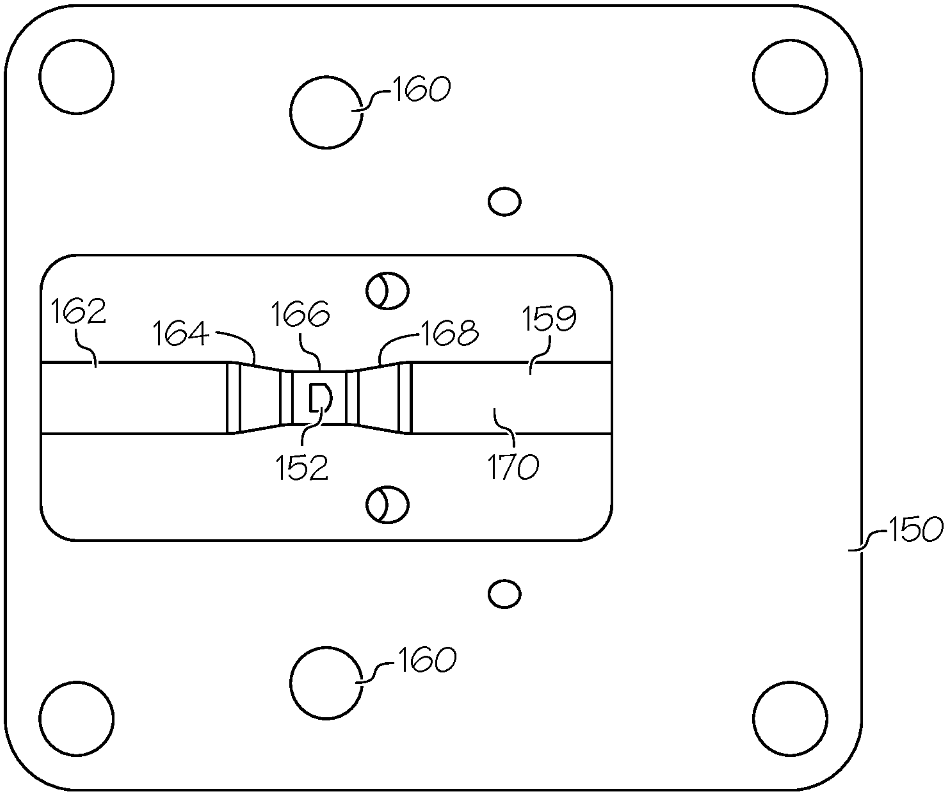
FIG. 23 is a view of a component of a tooling apparatus.

FIG. 23 is a top view of body 150 showing recess 159, opening 152, and holes 160. Holes 160 are sized and positioned so that body 150 can be positioned on guide pins 154. The blade (not shown) extends through opening 152 and into recess 159. In some embodiments of the invention, recess 159 is shaped with a semicircle cross section with a constant diameter of the semicircle. In other embodiments, recess 159 includes first section 162, first taper 164, landing zone 166, second taper 168, and second section 170. In some embodiments, first and second sections 162 and 170 have a larger diameter than landing pad 166 with the first and second taper sections 164 and 168 providing a smooth transition between the two sections and the landing pad. In designing skiver 130, first section 162 should be as large as possible so that the first end of a catheter or other devices that is fed through skiver 130 finds its way into the recess 159. However, having too large a diameter can lead to instability when using skiver 130. In some instances, the first end of the catheter will pass the blade at an angle. In other instances, if skiving a long catheter or other device that has a diameter smaller than the diameter of recess 159, the catheter or other device will become unstable and move back and forth when being propelled through the skiver by the rollers 136. To balance these competing needs, in one embodiment the recess 159 has a changing diameter. The first section 162 has a larger diameter to enable the first end of the device to be skived to enter the recess. To provide stability for the skiving process, the landing zone 166 has a smaller diameter to help stabilize the skived device as it moves through the skiver. The second section 170 can also have a larger diameter to reduce the friction between the skived device and the skiver.

The smaller diameter at the landing pad 166 as compared to sections 162 and 170 allows heat shrink removal from tapered parts. A catheter with a construction changing from a smaller diameter to a larger diameter will not lift the catheter out of the blade due to the short length of the landing pad. The same concept applies for a catheter design with a diameter changing from a larger first diameter and tapering down to a smaller diameter. Without the smaller diameter landing pad 166 guide 144 would be held open by the larger catheter until it left body 150 at the exit of section 170. The maximum size of a device to be skived is limited by the size of landing zone 166; the device must be slightly smaller than the size of opening 166 so that it can access the blade.

Figure 24:
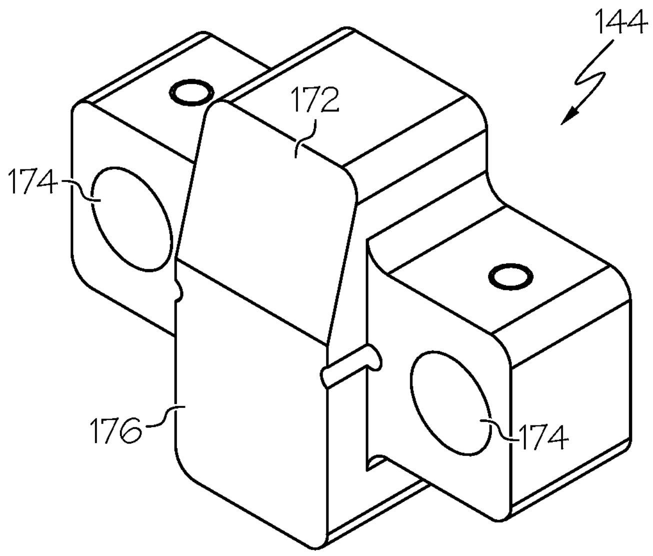
FIG. 24 is a view of another component of a tooling apparatus.

FIG. 24 is a perspective view of guide 144 and shows slanted surface 172, bottom surface 176, and two holes 174. The holes 174 are positioned so that the guide 144 can be positioned on guide pins 154. In some embodiments, guide 144 includes slanted surface 172. Slanted surface faces the direction that the catheter of skived device comes from. When the skived device is fed into skiver 130, the slanted surface helps guide the skived device into recess 159. For the embodiments shown in FIGS. 19 to 24, only one pair of rollers may be used in some embodiments. In some embodiments, rollers that pull the device through the skiver may be used. In other embodiments, rollers that push the device through the skiver may be used. In many embodiments, recess 159 is shown as a surface channel. In some embodiments, the recess may be a bore or other opening.

Figure 25:
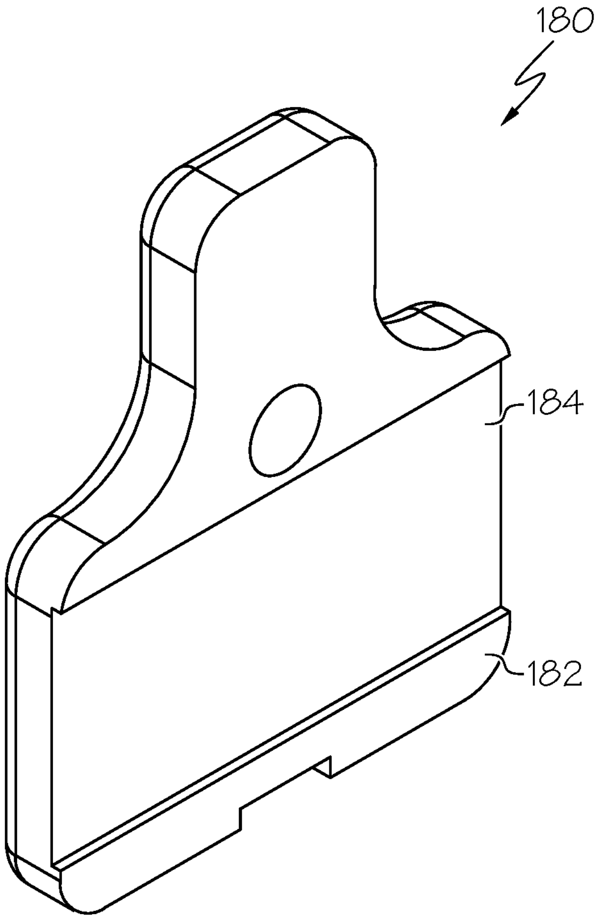
FIG. 25 is a view of the removable cover.

FIG. 25 is a perspective view of removable cover 180. The functions of the removable cover include providing access to the blade and shims or spacer elements (if any) and for stabilizing the sharp end of the blade. As seen in FIG. 25, the depth of the blade is more in the region of the cutting end of the blade 182 as compared to the non-cutting end 184. Movement of the device to be skived past the blade can cause instability and movement of the blade. As explained earlier, the blade is set to a depth of less than one to fifteen thousandths of an inch or more. Movement of the blade can result in a damaged skived device or in incomplete skiving. By extending the cover in the region of the cutting end of the blade 182, the cover provides a holding force that minimizes instability in the blade during the skiving process. In some embodiments, it has been determined that the edge of section 182 that is adjacent to section 184 acts as the point of pressure on the blade. As a result, the width of section 182 should be limited so that the point of pressure is close to the sharp end of the blade but needs to have sufficient width to provide stability to the blade.

Figure 26A:
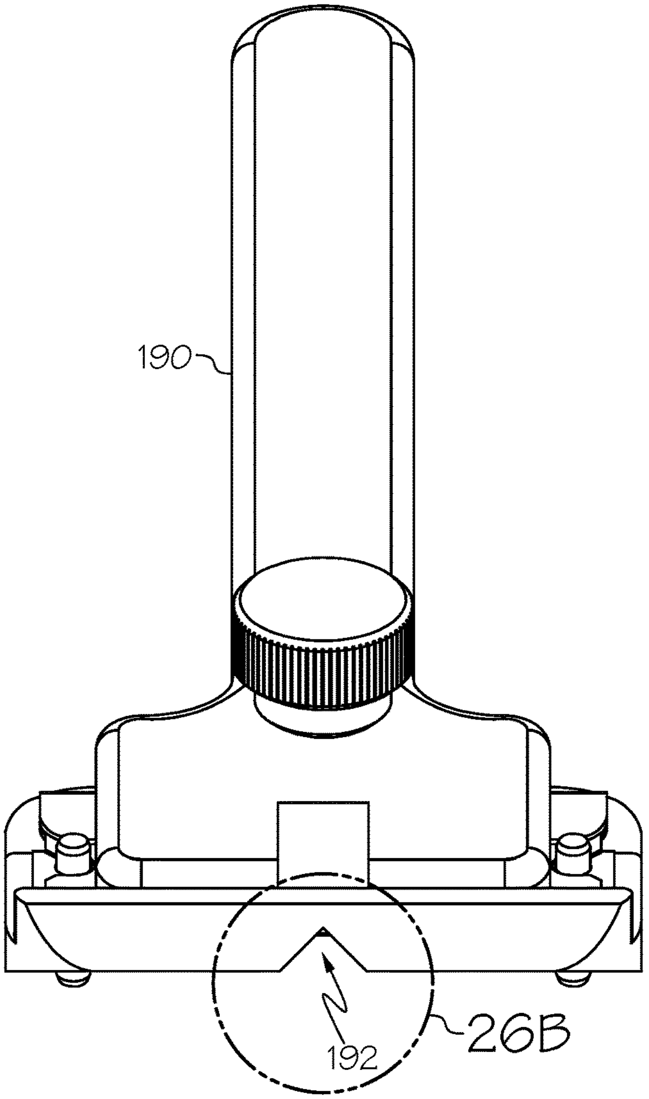
FIGS. 26A and 26B are views of a skiver for a product with a pointed edge.
Figure 26B:
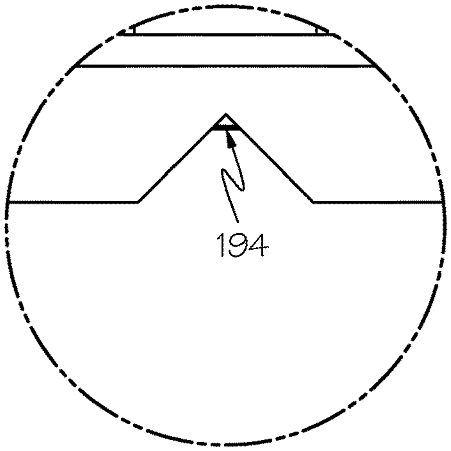

FIG. 26 is another embodiment of the invention. In this embodiment, the recess 192 is shaped to receive a device to be skived that is square, rectangular, or one that has a 90° or other angled edge. In this embodiment, the recess 192 comprises two flat surfaces, joined at one end, resulting in an opening of approximately 90° or another angle as desired. As seen in the detail, blade 194 extends across the peak of recess 192.

Figure 27A:
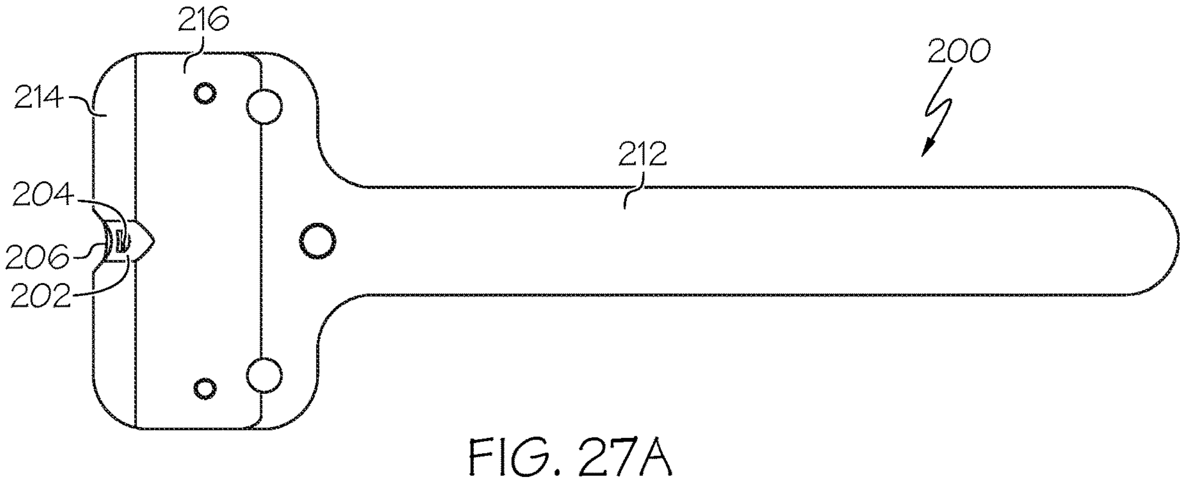
FIGS. 27A and 27B are another embodiment of the invention.
Figure 27B:
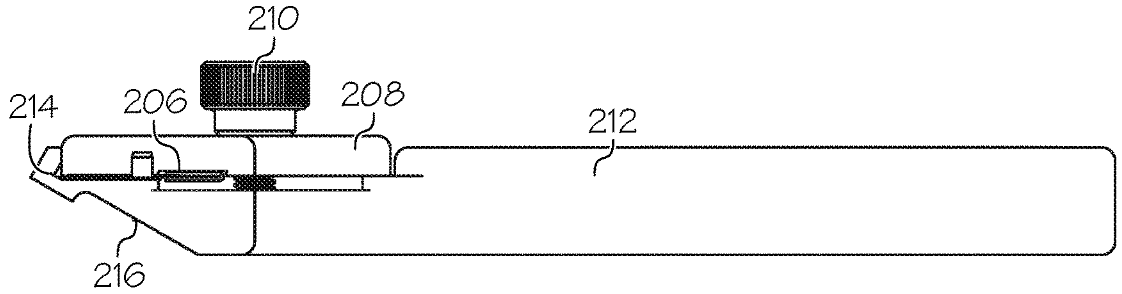

FIGS. 27A and 27B are another embodiment of the invention. In this embodiment, skiver 200 is designed to track a substrate that may be curved. FIG. 27A is a bottom view of skiver 200 including handle 212, bottom surface 216, and bottom projection 214. Recess 202 extends through projection 214 and includes opening 204 and blade 206. Blade 206 extends through opening 204 and into recess 202. FIG. 27B is a side view of skiver 200. In this view screw 210 holds removable cover 208 against blade 206. Spacer elements (not shown) can be used to adjust the depth that blade 206 extends into recess 202. As can be seen from this view, bottom surface 216 and bottom projection 206 have approximately the same angle relative to the longitudinal axis of skiver 212. Recess 202 primarily extends only through projection 206 and has a shorter landing zone for the device to be skived than other embodiments. This shorter landing zone allows the user to more easily skive substrates that are curved.

Figure 28A:
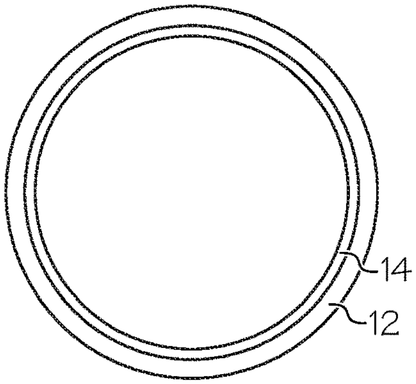
FIGS. 28A, 28B, and 28C shows the results of skiving a device.
Figure 28B:
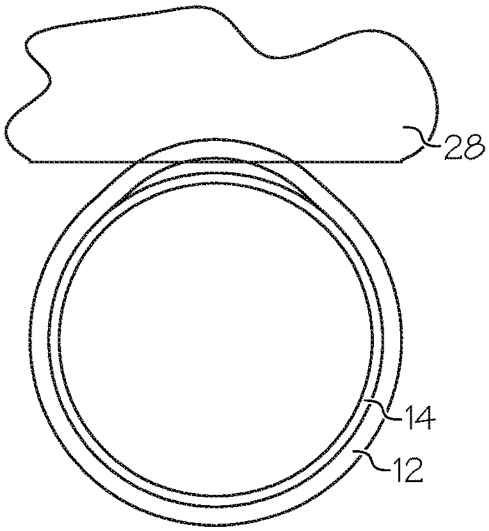
Figure 28C:
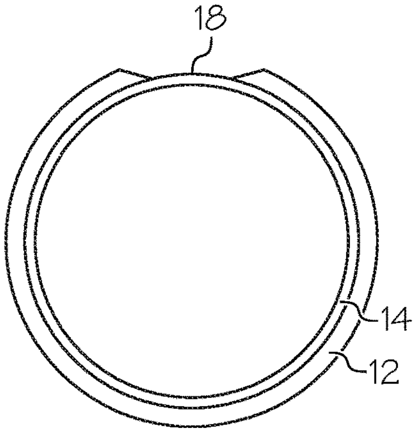

When using a blade such as a razor blade on an object, the blade has a tendency to 'dive' into the object. In the embodiments of this invention, the blade and object are relatively held in place, so this does not happen to a large extent. Applicant has found, however, when using the skiver on a device that has only a thin layer of material to be removed, the layer to be removed will pull away from the device and toward the blade. This will cause a vacuum to be formed under the material. As the device continues to move over the skiver, often the material to be removed will move so far away from the device that the blade will extend all the way through the material. However, since the blade and the device are held a constant distance apart, the blade will not damage the device. This is shown in FIGS. 28A, 28B, and 28C. FIG. 28A is a cross section of a catheter or other device to be skived. It is shown with shrink wrap (or other material to be removed) layer 12 on catheter or device 14. FIG. 28B shows blade 28, with the sharp end interfacing with the product to be skived, picking up layer 12 off of device 14. FIG. 28C is a post skiving view. Here, opening or slot 18 has been formed in shrink wrap layer 12 and there is no damage to device 14.

The embodiments described herein have wide applicability to a variety of catheters and other devices which have a layer of material to be removed. In some embodiments, FEP (fluorinated ethylene propylene) is removed from the outside of a medical catheter. In some instances, the FEP has a thickness of 0.009+/−0.002 inches. In this instance, the blade of the skiver will be set to a depth of about 0.0045 inches, or about 50% of the depth of the FEP. In other instances, a polyolefin with a thickness of about 0.009 inches is removed from the outside of a device. In this instance, the blade is set to a depth of 006 inches, or about ⅔ of the thickness of the polyolefin. These dimensions are merely examples. Applicant has found that setting the blade depth between ¼ and ¾ of the thickness of the material to be removed is generally acceptable.

Many of the recesses shown herein has a semicircular cross section. However, the invention is not limited to semicircular cross sections. In some embodiments, the cross section can be oval, an arc of a circle less than 180°, a flat surface, or a cross section with straight sides that join together at a peak in the area of the blade.

Many of the embodiments described herein have been described as being directed to a catheter or other round medical device or to a pack of batteries. The inventions, however, are not so limited. The devices of the invention can be used to open packaging (for example surgical scissors with heat shrink over the tips) and on fiber optics and other types of cables with a thin plastic exterior.

In many of the embodiments herein, the catheter or other device to be skived does not need to be of constant diameter. For example, the skiver of FIG. 1 can be used on a substrate of changing diameters provided the user keeps sufficient pressure on the skiver 10 such that blade 28 stays engaged with the device. The slidable jaw 46 shown in FIG. 11 is biased toward the skiver 10. In the event that the device being skived changes dimension, the slidable jaw will keep it firmly in position so that the skiving will continue over the changed dimension of the product being skived. The floating guide 144 shown for example in FIGS. 22A and 22B, will put sufficient pressure on the device being skived such that a change in dimension will not affect the skiving.

As discussed above, prior art skiving apparatus and methods can include the use of a blade to cut the material that is to be removed. In the embodiments herein, the skive operator is protected from the blade and is much less likely to be injured during the skiving process. In the automatic skiver operation, it is very unlikely that the skiver operator can be injured as the blade is not readily accessible.

From the foregoing, it will be appreciated that the present invention comprises an improved skiver having several advantages over the prior art. The skiver herein is adjustable and precise. It facilitates removal of thin material from the outside of a product while minimizing if not avoiding possible damage to the product and/or injury to the user. It can also be used to cut a precise longitudinal slot in the wall of a product. The skiver herein can be handheld, used with a separate mount or automated. Other advantages will be apparent to those skilled in the art.

In the detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "X", "Y", "N", "M", etc., particularly with respect to reference numerals in the drawings, indicate that a number of the particular feature so designated can be included. It is also to be understood that the terminology used herein is for the purpose of describing particular embodiments only and is not intended to be limiting. As used herein, the singular forms "a", "an", and "the" can include both singular and plural referents, unless the context clearly dictates otherwise. In addition, "a number of", "at least one", and "one or more" (e.g., a number of pivot points) can refer to one or more pivot points, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically or for access to and movement of the movable handle member, as appropriate to the context.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A skiver comprising:

a chassis having a front and a back, the chassis arranged to be supported upon a planar surface, the chassis comprising an internal roller cavity, a tooling cavity and a lumen extending from the front to the back;

a tooling apparatus comprising a body comprising a longitudinal recess of a predetermined cross section; an opening extending to the longitudinal recess; a blade comprising a linear cutting edge, the linear cutting edge disposed in the opening, the tooling apparatus removable from the chassis, the tooling apparatus positionable in the tooling cavity with the longitudinal recess aligned with the lumen;

a first motorized roller and a second motorized roller oriented in the internal roller cavity, the first motorized roller comprising a no crush roller, the second motorized roller comprising a no crush roller, the first motorized roller contacting the second motorized roller, wherein the first motorized roller and the second motorized roller are configured to move an object through the lumen and the longitudinal recess; and a switch arranged to operate the first motorized roller and the second motorized roller.

2. The skiver of claim 1, the tooling apparatus further comprising a removable cover for securing the blade in the opening of the longitudinal recess.

3. The skiver of claim 1, the tooling apparatus further comprising a guide moveable with respect to the body, the guide positioned above the longitudinal recess and arranged to move into the longitudinal recess, the guide biased toward the blade by gravity and arranged to rest upon an object oriented in the longitudinal recess, the guide having a lower surface, wherein a portion of the lower surface is slanted to aid in the feeding of an object into the longitudinal recess.

4. The skiver of claim 1, the chassis comprising a second internal roller cavity, a third motorized roller and a fourth motorized roller positioned in the second internal roller cavity, wherein the first motorized roller and the second motorized roller are positioned to a first side of the longitudinal recess and the third motorized roller and the fourth motorized roller are positioned to a second side of the longitudinal recess.

5. The skiver of claim 1, the predetermined cross section of the longitudinal recess is a semicircle, with a diameter.

6. The skiver of claim 5 wherein the diameter of the longitudinal recess is varying along its length.

7. The skiver of claim 6 wherein the diameter of the longitudinal recess at the location of the opening is smaller than the diameter of the longitudinal recess before and after the location of the opening.

8. The skiver of claim 7 wherein the longitudinal recess is tapered on each side of the opening.

9. The skiver of claim 1 further comprising a spacer element positioned between the blade and the body to adjust a depth that the blade extends into the longitudinal recess.

10. The skiver of claim 1, the chassis comprising a first foot, a second foot and a third foot arranged on a common plane.

11. A skiver comprising:

a chassis arranged to be supported by a flat work surface, the chassis comprising a front, a back, a tooling cavity and a lumen extending from the front to the back; and a tooling apparatus comprising:

a body comprising a longitudinal recess, a blade recess and an opening between the longitudinal recess and the blade recess;

a blade oriented in the blade recess, the blade comprising a cutting edge, a portion of the cutting edge positioned in the opening;

a cover attached to the body by a fastener, the cover arranged to secure the blade; and a guide member moveable with respect to the body and the longitudinal recess along a linear axis, the linear axis orthogonal to the longitudinal recess, the guide member positioned above the blade, the guide member biased toward the blade by gravity, the guide member arranged to extend into the longitudinal recess and rest upon an object oriented in the longitudinal recess and bias the object toward the blade under the force of gravity;

the tooling apparatus removable from the chassis, the tooling apparatus positionable in the tooling cavity with the longitudinal recess aligned with the lumen.

12. The skiver of claim 11, the chassis further comprising an internal roller cavity, a first roller and a second roller positioned in the internal roller cavity arranged to move the object through the lumen, wherein the rollers comprise no-crush rollers.

13. The skiver of claim 12, wherein the first roller contacts the second roller when the object is not oriented in the longitudinal recess.

14. The skiver of claim 11, the guide member comprising a bottom surface arranged to contact the object and a slanted surface adjacent to the bottom surface, the slanted surface oriented at an angle to the bottom surface.

15. The skiver of claim 11, the body comprising at least one guide pin comprising the linear axis, the guide member arranged to move along a length of the guide pin.

16. The skiver of claim 15, the chassis comprising a guide pin cavity, a portion of the guide pin oriented in the guide pin cavity.

17. The skiver of claim 11, the guide member comprising a stop arranged to limit movement of the guide with respect to the body.

18. The skiver of claim 17, wherein the stop is adjustable.

19. The skiver of claim 11, comprising a first magnet attached to the guide member and a second magnet attached to the body, wherein magnetic force between the first magnet and the second magnet biases the guide member toward the blade.

20. The skiver of claim 11, the chassis comprising a a first foot, a second foot and a third foot arranged on a common plane.

* * * * *